(12) United States Patent
Kibalo et al.

(10) Patent No.: US 10,402,566 B2
(45) Date of Patent: Sep. 3, 2019

(54) HIGH ASSURANCE CONFIGURATION SECURITY PROCESSOR (HACSP) FOR COMPUTING DEVICES

(71) Applicant: The Aerospace Corporation, El Segundo, CA (US)

(72) Inventors: Thomas Kibalo, Annapolis, MD (US); Ronald Scrofano, Los Angeles, CA (US); Andrew Deeds, Hermosa Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 312 days.

(21) Appl. No.: 15/224,688

(22) Filed: Aug. 1, 2016

(65) Prior Publication Data
US 2018/0034793 A1    Feb. 1, 2018

(51) Int. Cl.
*H04L 9/32*  (2006.01)
*G06F 21/57* (2013.01)
*H04L 29/06* (2006.01)

(52) U.S. Cl.
CPC .................................. *G06F 21/575* (2013.01)

(58) Field of Classification Search
CPC .............................. H04L 63/061; G06F 21/575
USPC ............................. 726/1, 6; 713/2, 164, 171
See application file for complete search history.

(56) References Cited

U.S. PATENT DOCUMENTS

| | | | | |
|---|---|---|---|---|
| 8,756,417 B1* | 6/2014 | Gardner | ................ | G06F 21/57 380/262 |
| 2006/0143446 A1* | 6/2006 | Frank | .................... | G06F 21/57 713/164 |
| 2008/0077993 A1* | 3/2008 | Zimmer | ............... | G06F 9/5077 726/27 |
| 2009/0049514 A1* | 2/2009 | Yan | ...................... | G06F 21/445 726/1 |
| 2010/0031026 A1* | 2/2010 | Cizas | .................... | G06F 21/76 713/156 |
| 2011/0154010 A1* | 6/2011 | Springfield | ............ | G06F 21/57 713/100 |
| 2011/0302638 A1* | 12/2011 | Cha | ....................... | G06F 21/57 726/6 |

(Continued)

OTHER PUBLICATIONS

Configuration Measurement for FPGA-based Trusted Platforms, Benjamin Glas, 2009 IEEE/IFIP International Symposium on Rapid System Prototyping (Year: 2009).*

(Continued)

*Primary Examiner* — Gary S Gracia
(74) *Attorney, Agent, or Firm* — LeonardPatel PC

(57) ABSTRACT

A High Assurance Configuration Security Processor (HACSP) for a computing device may perform real-time integrity measurements of an actual bitstream run-time performance against what is expected. The HACSP may be self-contained and have a relatively small footprint. The HACSP may be vendor-agnostic, and may be a trusted system application for the computing device. The HACSP may ensure the security of user application bitstream load and update during device configuration, and may implement security mechanisms for independent secure trusted attestation and integrity measurement mechanisms to report and provide reliable evidence about the "trustworthiness" of the system during user bitstream execution.

46 Claims, 15 Drawing Sheets

(56) References Cited

U.S. PATENT DOCUMENTS

| | | | |
|---|---|---|---|
| 2012/0102313 A1* | 4/2012 | Nicolson | G06F 21/575 713/2 |
| 2012/0299831 A1* | 11/2012 | Lioy | G06F 21/36 345/168 |
| 2015/0012737 A1* | 1/2015 | Newell | G06F 21/575 713/2 |
| 2015/0095631 A1* | 4/2015 | Rahardjo | G06F 21/602 713/2 |
| 2015/0199520 A1* | 7/2015 | Woolley | G06F 21/575 713/2 |
| 2016/0070887 A1* | 3/2016 | Wu | G06F 21/84 713/189 |
| 2016/0247002 A1* | 8/2016 | Grieco | G06F 21/86 |
| 2016/0335459 A1* | 11/2016 | Kling | G06F 21/74 |

OTHER PUBLICATIONS

FPGA-Based Remote-Code Integrity Verification of Programs in Distributed Embedded Systems, Cataldo Basile, IEEE Transactions on Systems, Man, and Cybernetics—Part C: Applications and Reviews, vol. 42, No. 2, Mar. 2012 (Year: 2012).*

Feller et al., "TinyTPM: A Lightweight Module Aimed to IP Protection and Trusted Embedded Platforms," 2011 IEEE International Symposium on Hardware-Oriented Security and Trust (HOST), San Diego, CA, pp. 6-11 (Jun. 5 and 6, 2011).

George Coker et al., "Principles of Remote Attestation," Int. J. Inf. Secur., vol. 10, pp. 63-81 (2011).

Liqun Chen et al., "Attack, Solution and Verification for Shared Authorisation Data in TCG TPM," 6th International Workshop, FAST 2009, Eindhoven, The Netherlands, pp. 201-216 (Nov. 5 and 6, 2009).

Ray Beaulieu et al., "Performance of the Simon and Speck families of Lightweight Block Ciphers," (2012).

* cited by examiner

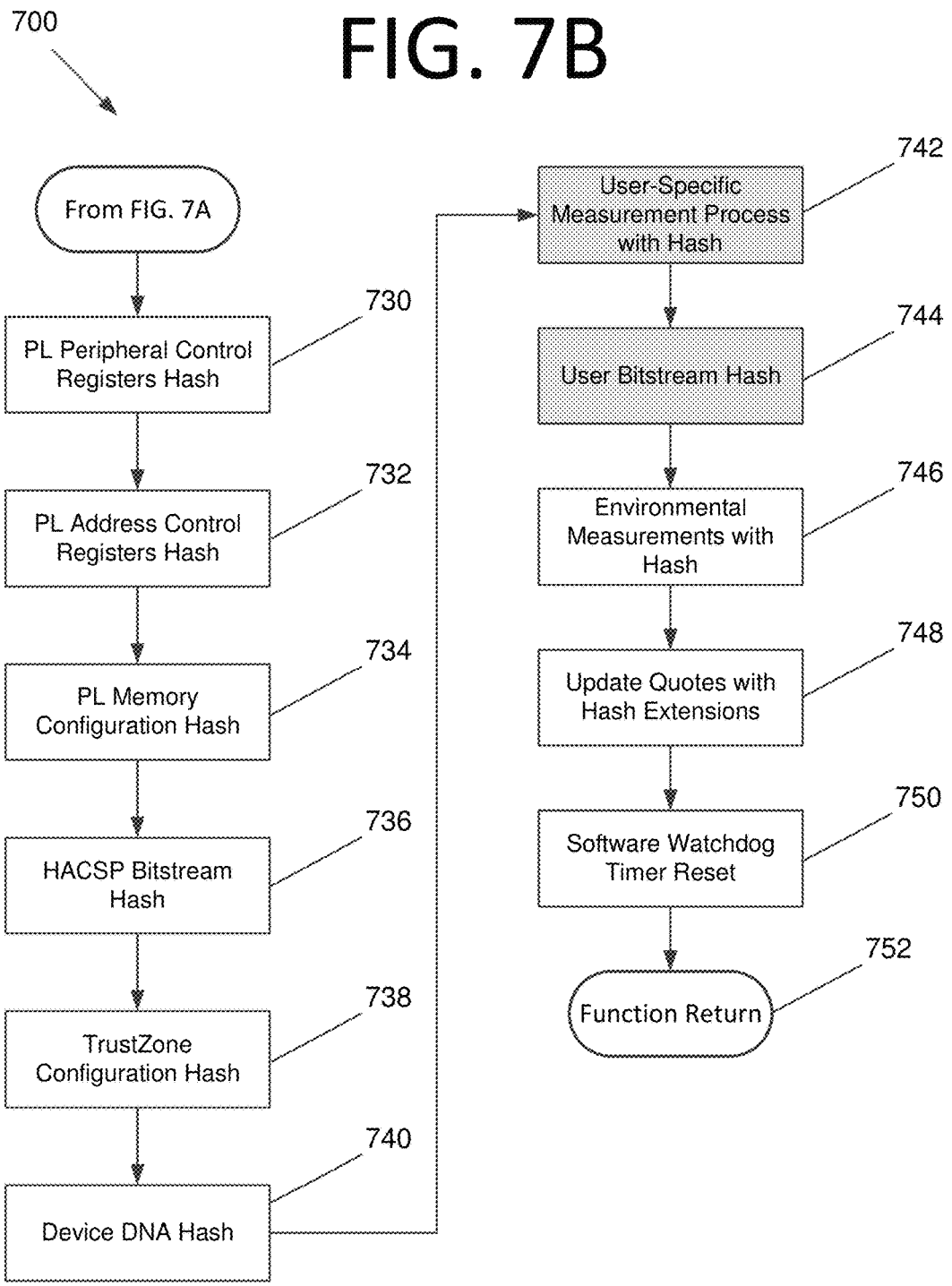

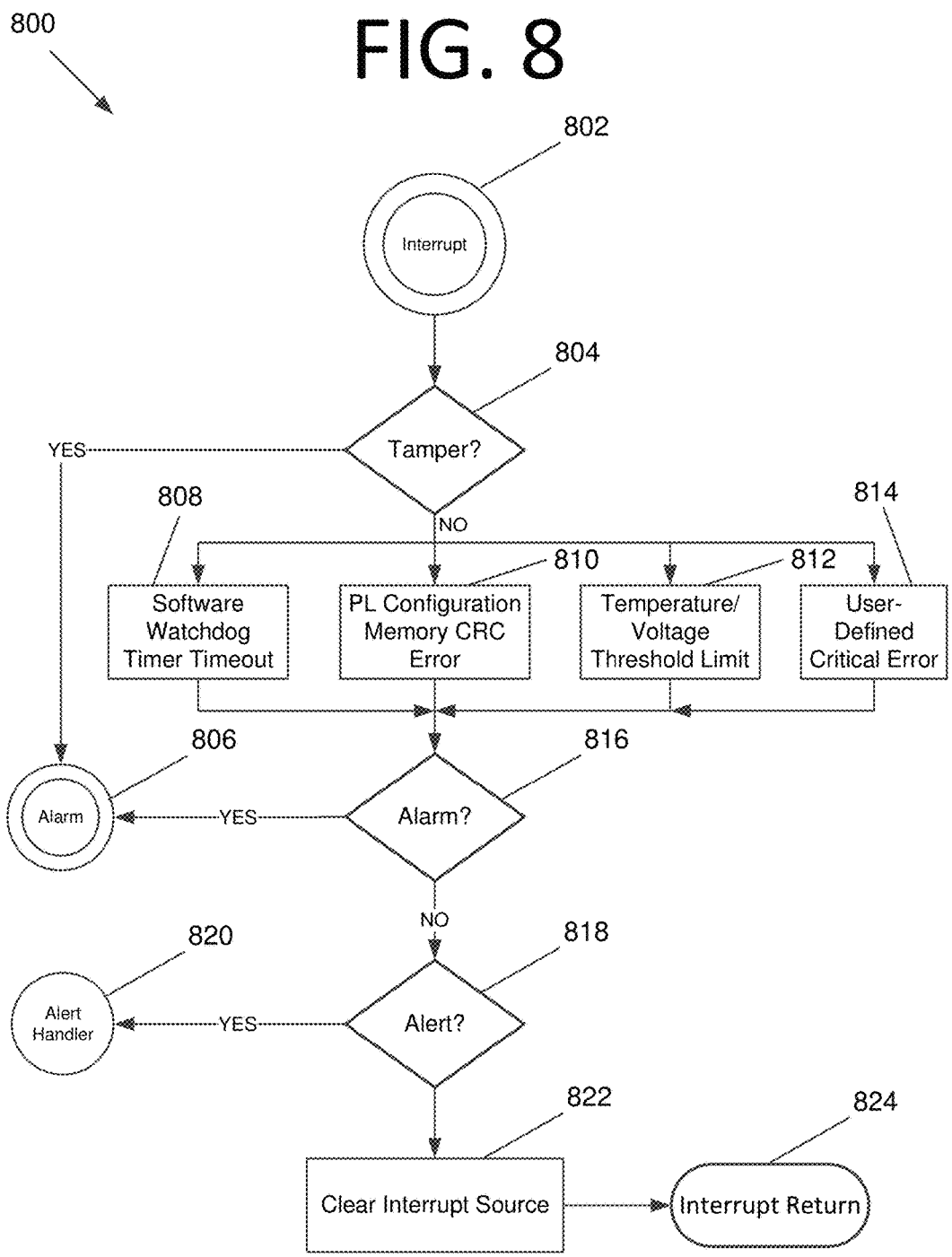

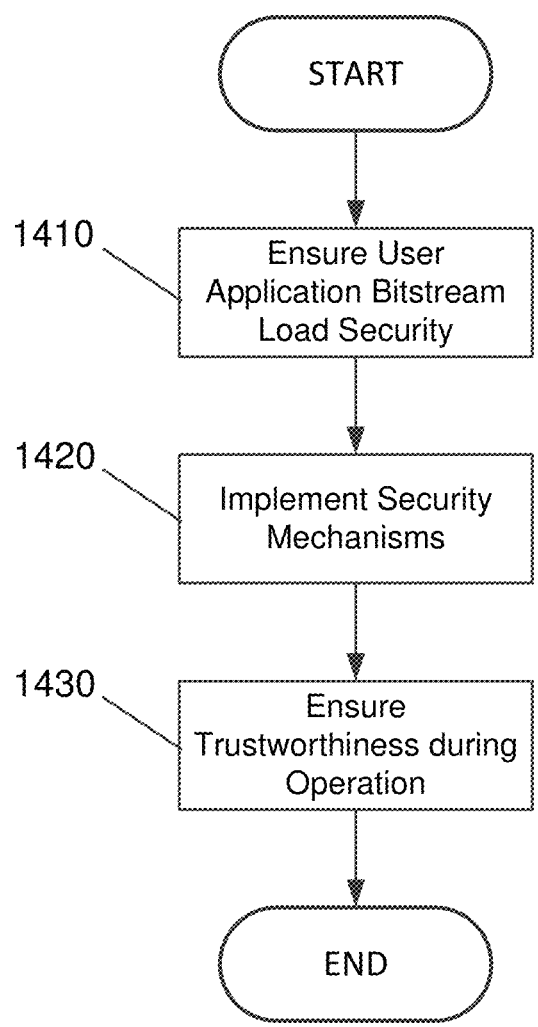

US 10,402,566 B2

HIGH ASSURANCE CONFIGURATION SECURITY PROCESSOR (HACSP) FOR COMPUTING DEVICES

FIELD

The present invention generally pertains to software and hardware security, and more particularly, to a High Assurance Configuration Security Processor (HACSP) for computing devices.

BACKGROUND

A trusted system is defined as a system that is predictable in operation and always functions in an assured known and expected state, even under stress. Trusted systems are based foundationally on a Root of Trust (RoT). RoT can be seen as a set of minimized strongly protected security functions that are always deemed "trustworthy" during system operation. The RoT should be simple enough or sufficiently evaluated that one can be convinced that integrity re-measurement is not required once running RoTs work in unison as a core Trusted Computing Base (TCB) for Trusted Platforms. The TCB is used for highly secure sensitive functions, like cryptographic processing, random number generation, key management, and to verify system integrity on startup (secure boot). The employment of RoTs as a TCB to enable "trusted systems" is a foundational architectural engineering approach, which has been advanced and advocated by the Trusted Computing Group (TCG) in the context of their Trusted Platform Module (TPM). The U.S. semiconductor industry currently employs various types of tamper-detection indicators and various RoT techniques to foster increased trust/confidence in the semiconductor supply chain and increased assurance in the mission development process and source distribution.

However, confidence in asserting the trustworthiness of a FPGA configuration and its functionality during startup and during operation is explicitly more challenging than current static "trust" approaches and implementations currently utilized by vendors for enabling supply chain or development assurances. Given the total reprogrammable nature of FPGA devices, RoTs based on dynamic trusted computing specifications and implementation architectures are required. RoTs are needed not only to provide trusted mechanisms for secure bitstream distribution and the bitstream loading at "start-up/boot-up," but more importantly, to provide secure RoT mechanisms for continuously monitoring the device's functional integrity during bitstream execution/operation. These RoTs need to verify and report (i.e., attest) FPGA bitstream authenticity during run-time to an outside appraiser tasked with accessing system operational integrity and mission assurance during operation, of which the FPGA is an integral component.

FPGAs typically load a user programming bitstream, which contains a user application, from external storage. Besides requiring a second device, the transmission of the program from the nonvolatile external memory to the FPGA may expose the programming to a potential adversary. A good security best approach to thwart an adversary is to store and retrieve the bitstream in encrypted format, and then decrypt the bitstream within the FPGA, making it inaccessible by an adversary. Authentication of the bitstream, as another important security step, can occur on chip before and/or after the decryption process.

TCG has precedence in specifying RoTs with their TPM. This is the primary industry standard for defining the hardware RoT and the foundation for secure software within personal computers (PCs). The latest TPM, release 2.0, implements RoTs through a secure boot and extended chains of trust to provide a TCB for secure measurement, storage, and some reporting services using a low cost integrated circuit (IC), which is physically attached to the PC motherboard.

The initial and primary purpose of TPM is to ensure host (PC) integrity at startup/boot-up. The TPM precedence has been a natural starting point for the introduction of trusted computing RoT options within FPGAs. However, because of the unwieldly size and scope of TPM, direct adaption for FPGA application is not practical. Nevertheless, a simplified and modified implementation of RoTs based upon a secure boot extension for secure measurement, storage, and reporting has been adapted for FPGA startup.

Consequentially, the majority of current FPGA vendors offer secure boot for initializing their FPGAs. Secure applications can and do use this secure boot to enable RoT for remote secure bitstream update, and to provide and conduct system configuration and bitstream measurement integrity check before and after an update is performed. However, relying on this type of static integrity measurement as a true representation of the device's continued state can be misleading. For example, cyberattacks conducted using dynamically triggered malware would likely be activated between software and firmware updates. Accordingly, an improved approach may be beneficial.

SUMMARY

Certain embodiments of the present invention may be implemented and provide solutions to the problems and needs in the art that have not yet been fully solved by conventional RoT and TPM technologies. For example, some embodiments pertain to a High Assurance Configuration Security Processor (HACSP) for an FPGA that performs real-time integrity measurements of the actual bitstream run-time performance against what is expected. While "FPGA" is used often in this disclosure as the computing device on which some embodiments of the present invention run, any suitable computing device, such as a PSoC or similar configurable device, or an Application-Specific IC (ASIC), may be used in some embodiments without deviating from the scope of the invention.

In an embodiment, a computer-implemented method for providing a HACSP for a computing device includes ensuring, by the HACSP, security of a user application bitstream load and update during computing device configuration. The computer-implemented method also includes implementing security mechanisms, by the HACSP, for independent secure trusted attestation and integrity measurement mechanisms to report and provide reliable evidence about trustworthiness of the computing device during user bitstream execution without stopping operation and between load and updates.

In another embodiment, a HACSP computer program is embodied on a non-transitory computer-readable medium. The program is configured to cause at least one processing core of a computing device to implement security mechanisms for independent secure trusted attestation and integrity measurement mechanisms to report and provide reliable evidence about trustworthiness of the computing device during user bitstream execution without stopping operation.

In yet another embodiment, a computing device includes a HACSP residing as a software application in a first processing core associated with a Trusted Execution Environment (TEE). The HACSP is configured to monitor user applications in software that runs on a second processing core. The HACSP is also configured to implement security mechanisms for independent secure trusted attestation and integrity measurement mechanisms to report and provide reliable evidence about trustworthiness of the computing device during user bitstream execution without stopping operation.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A and 7B are flowcharts illustrating a process for performing HACSP real-time monitoring (RTM) based on an RTM function call, according to an embodiment of the present invention.

FIG. 8 is a flowchart illustrating a process for performing HACSP RTM based on an interrupt, according to an embodiment of the present invention.

FIG. 14 is a flowchart illustrating a process for a HACSP for an FPGA, according to an embodiment of the present invention.

DETAILED DESCRIPTION OF THE EMBODIMENTS

Figure 1:
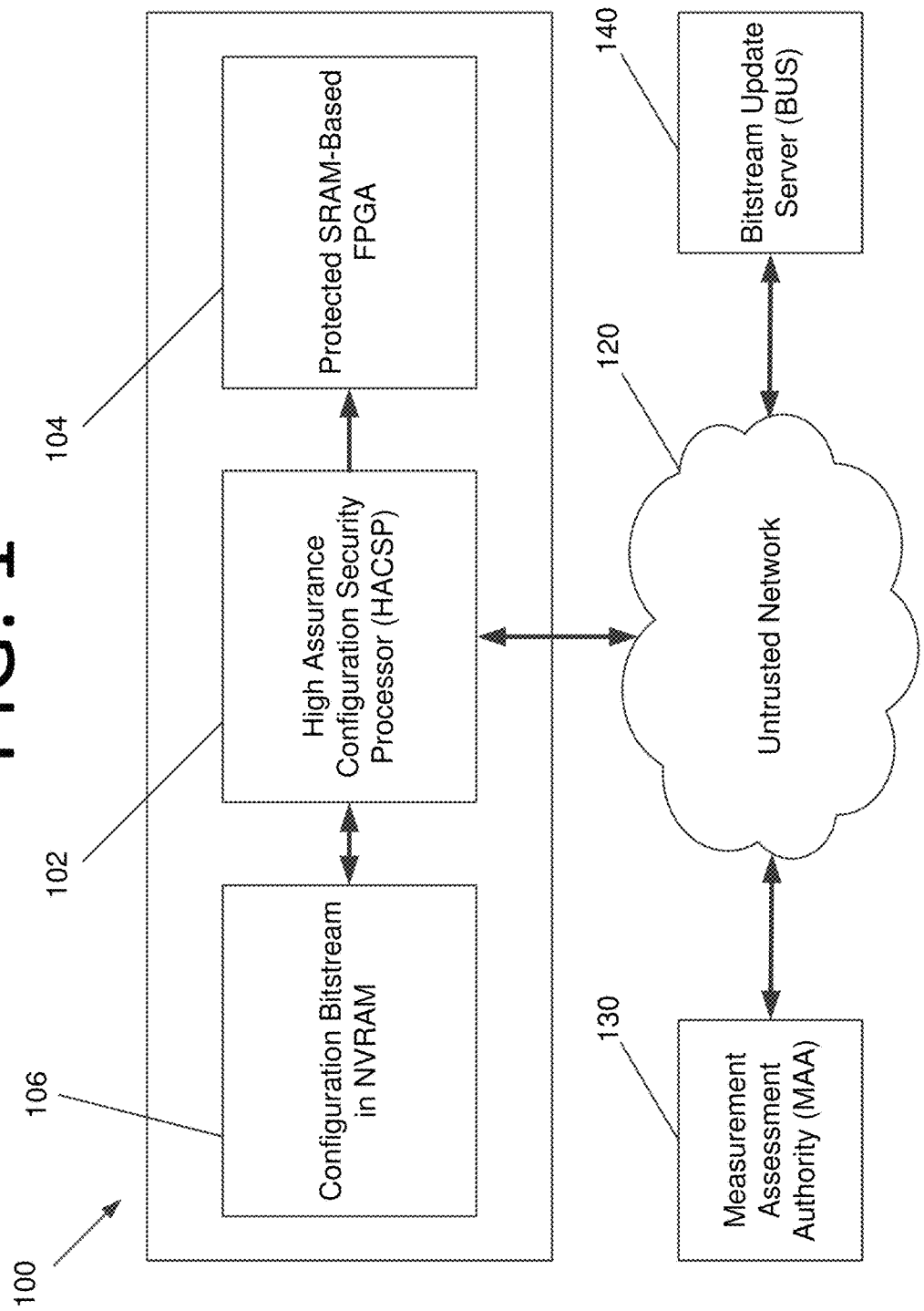
FIG. 1 is an architectural diagram illustrating an FPGA system with a HACSP, according to an embodiment of the present invention.

Some embodiments of the present invention pertain to a HACSP for an FPGA that performs real-time integrity measurements of the actual bitstream run-time performance against what is expected. This is lacking in the current RoT at startup approach, which only runs before and after software and firmware updates. As such, conventional RoTs are not sufficient to protect FPGAs.

The HACSP in some embodiments may be self-contained and may have a small footprint. The HACSP may be vendor-agnostic, and may be a trusted system application for the FPGA. In some embodiments, the HACSP ensures the security of user application bitstream load and update during device configuration, and implements security mechanisms for independent secure trusted attestation and integrity measurement mechanisms to report and provide reliable evidence about the "trustworthiness" of the system during user bitstream execution. The HACSP may implement a verifiable RoT from system initialization to system operation for device loading, device boot-up, device initialization, device configuration, and during operation.

In some embodiments, the HACSP may implement a RoT for secure boot and initialization of itself and user applications. The HACSP may also implement a RoT for secure dynamic update of user-furnished partial or full configurations. The HACSP may further implement a RoT for secure continuous real-time monitoring of both its own operation and user software execution, for secure continuous real-time internal monitoring of the device environment, and for secure continuous real-time internal monitoring of user bitstream execution. The HACSP may also implement a RoT for secure audit/log to track its key, operations, alerts, and execution control alternatives incurred during its operation, and for secure attestation to a remote system security appraiser on its operational status and the status of the user system using secure light cryptography and attestation protocols. The HACSP in some embodiments may support RoT to autonomously alarm to a "safe" state based on one or more measurements that reveals critical malfunctions in system operations or active tamper condition. The safe state may involve the system locking down all user operations, but retaining HACSP communication to allow update (reconfiguration) and quote (integrity reports) to support appraiser assessment, analysis, and corrective response to malfunction or attack. See, e.g., 520, 530 in FIG. 5.

The HACSP may address the critical trusted computing RoT needs required to achieve a "trusted FPGA" for enablement of a high confidence cyber conjunction with Department of Defense (DOD) supply chain and mission assurance development RoT. The HACSP footprint may be small to minimize impact to the user on available FPGA gate resources and/or processing bandwidth. The HACSP in some embodiments can be implemented in hardware, software, or both. The small footprint implementation may be accomplished through the use of a lightweight cryptography algorithm (e.g., SPECK or SIMON) rather than the Advanced Encryption Standard (AES), and through the use of a restricted minimal set of TPM commands and protocols for RoT services.

FIG. 1 is an architectural diagram illustrating an FPGA system 100 with a HACSP 102, according to an embodiment of the present invention. FPGA system 100 also includes a protected SRAM-based FPGA 104 and a configuration bitstream in NVRAM 106. HACSP 102 communicates over an untrusted network 120, which is also connected to a Measurement Assessment Authority (MAA) 130 and a Bitstream Update Server (BUS) 140.

NVRAM 106 is a nonvolatile storage component that holds the encrypted bitstream/keys for access by HACSP 102 during secure boot up configuration and/or FPGA configuration updates HACSP 102 uses this information to write to SRAM within FPGA 104 for application configuration. HACSP 102 communicates securely with two external generic entities. MAA 130 facilitates overall assessment of the trustworthiness of operations of FPGA 104 by receiving and analyzing integrity measurement (quotes) for HACSP 102 and BUS 140. BUS 140 provides secure bitstream updates or reconfigurations for FPGA 104.

To address trusted Programmable System-on-a-Chip (PSoC) FPGA capabilities, the starting point in some embodiments is the HACSP, such as HACSP 102 of FIG. 1. The HACSP may provide functionality including, but not limited to: (1) a verifiable RoT chain; (2) system boot and initialization from non-volatile memory; (3) secure update of Programmable Logic (PL) bitstreams and Programmable System (PS) software from a remote server; (4) measurement of the current system configuration that can be used to verify system integrity based on values stored at bitstream load time with extension to dynamic measurements; and/or (5) secure partial reconfiguration of the PL.

Figure 2:
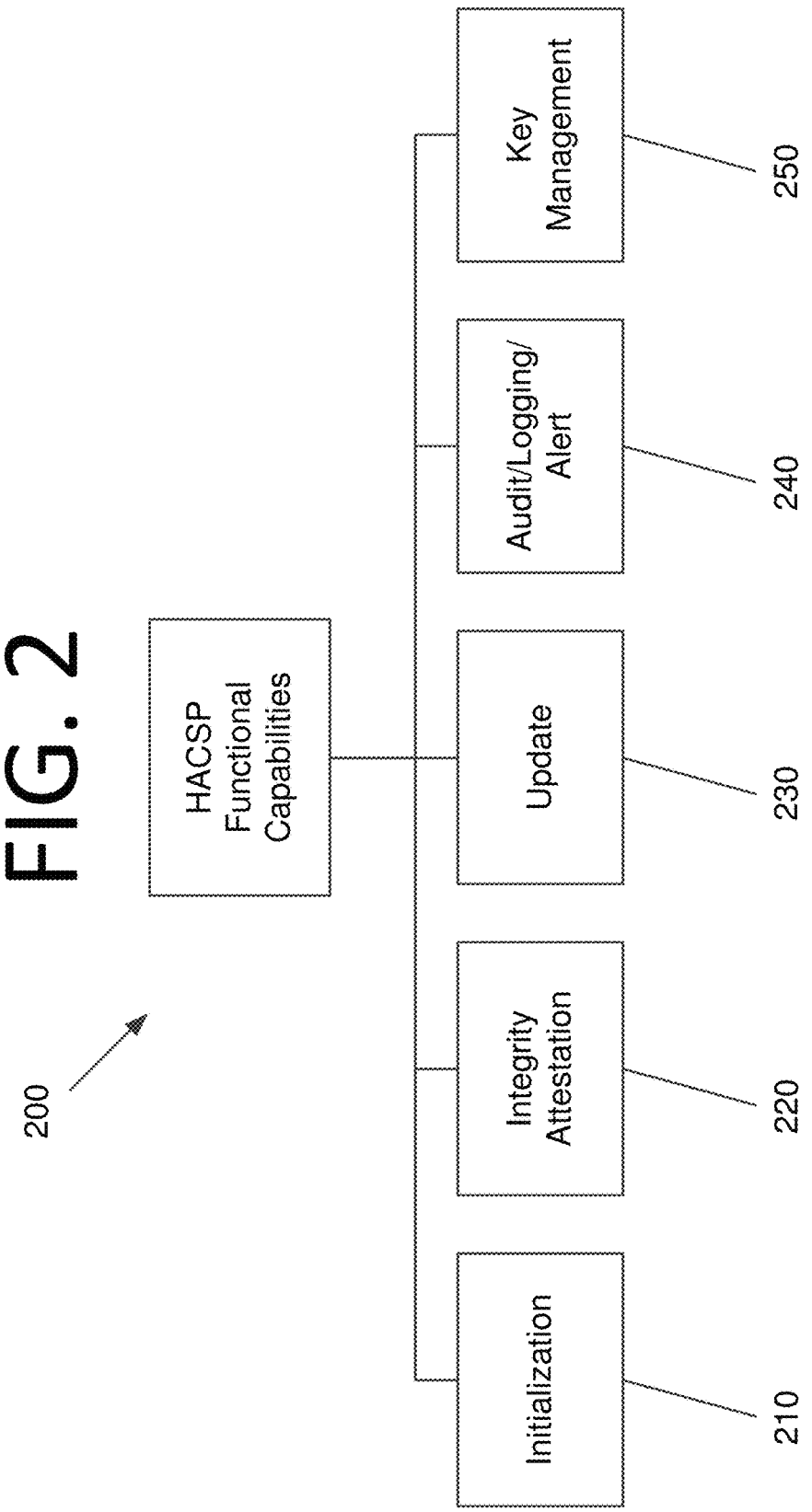
FIG. 2 is a capabilities diagram illustrating baseline trusted HACSP capabilities, according to an embodiment of the present invention.

FIG. 2 is a capabilities diagram illustrating baseline trusted HACSP capabilities 200, according to an embodiment of the present invention. Trusted HACSP capabilities include initialization 210, which provides verifiable RoT and system boot from non-volatile memory (NVM). Integrity attestation 220 is also provided, which includes, but it not limited to: (1) continuous monitoring of integrity; (2) configuration/operation measurement; (3) authentication of the bitstream to an outside appraiser; (4) bitstream version determination; and/or (5) assessment of bitstream authorization.

HACSP capabilities 200 also include update 230, which includes, but is not limited to: (1) secure storage for full/partial updates; (2) secure update of bitstreams from remote server; (3) secure selection/loading of bitstreams; (4) user control of bitstream execution; and/or (5) non-rollback mode. HACSP capabilities 200 further include audit/logging/alert 240, which includes, but is not limited to: (1) tracking and logging execution of the bitstream; (2) alert/execution control if an unauthorized bitstream configuration is attempting loading; and/or (3) alert/execution control if an unauthorized bitstream configuration is attempting execution. Additionally, HACSP capabilities 200 may include key management 250, which may include Session Key Authorization Protocol (SKAP) keys and user bitstream key associations in some embodiments.

Figure 3:
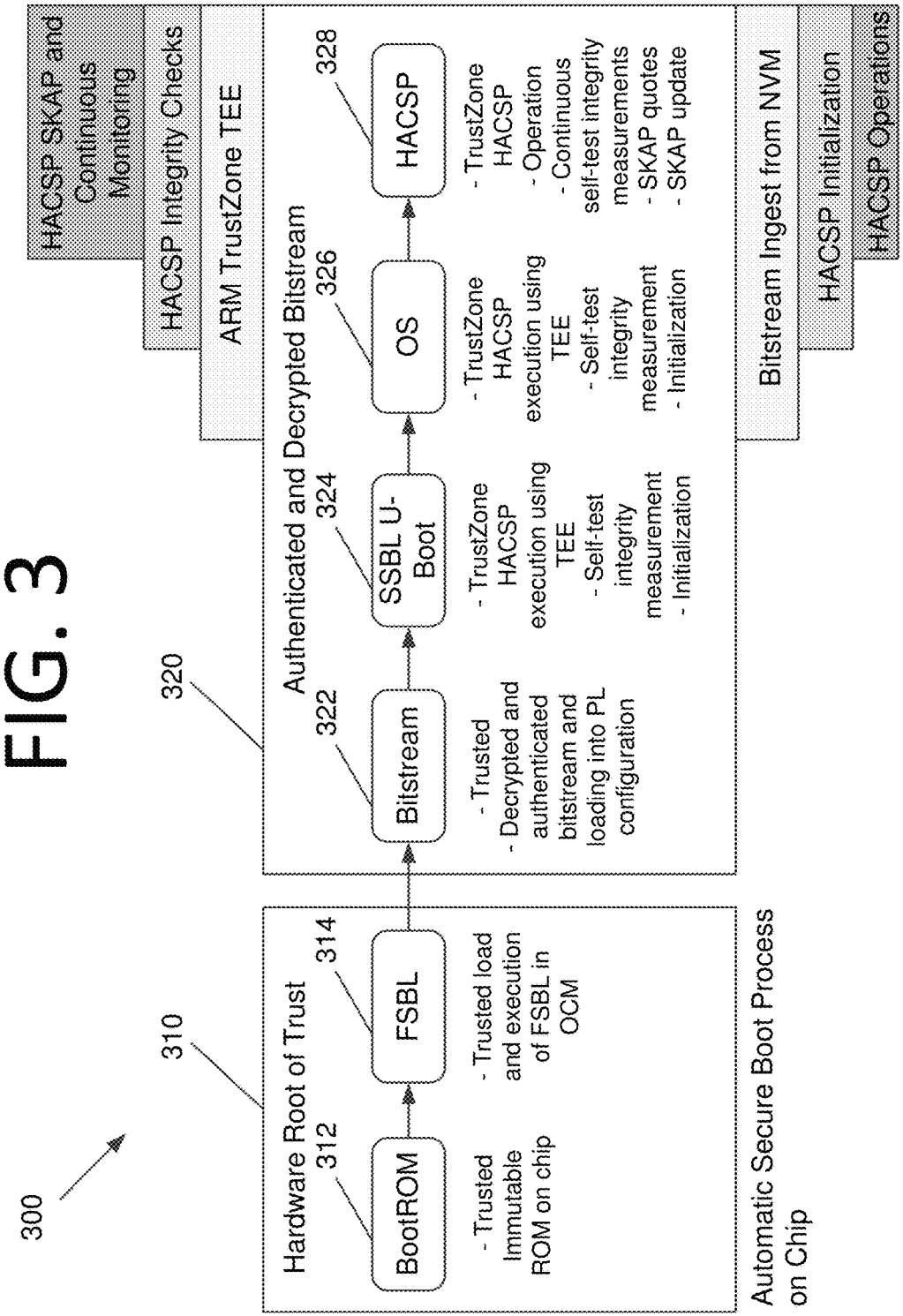
FIG. 3 is a block diagram illustrating trusted FPGA trust assumptions, according to an embodiment of the present invention.

FIG. 3 is a block diagram 300 illustrating trusted FPGA trust assumptions, according to an embodiment of the present invention. RoTs establish a chain of trust in an execution environment so that only an isolated Trusted Execution Environment (TEE) is the "trusted" HACSP execution environment. Boot Read Only Memory (BootROM) 312 is a 128K mask programmed BootROM in this embodiment that includes BootROM code. BootROM 312 is not visible to the user or writable. The BootROM code reads the Boot Mode Register (BMR) and initializes essential clocks and NVM at startup or power on reset. For all boot modes except JTAG, the BootROM code uses the memory controller to copy the First Stage Bootloader (FSBL) partition from the specified NVM to the On-Chip Memory (OCM).

FSBL 314 is loaded into OCM by the BootROM code. The principle function of FSBL 314 is to copy partitions from NVM to DDR and PL configuration memory. Prior to loading partitions, FSBL 314 completes the initialization of the device started by the BootROM code.

FSBL 314 support AES encryption, HMAC authentication, and RSA authentication. Private keys are used in AES encryption and HMAC authentication, and private/public key pairs are used in RSA authentication. For RSA authentication, signed partitions are verified by BootROM code and FSBL 314. If the partition is encrypted, the partition is routed to the AES/HMAC engine for decryption before it is loaded in DDR or other destination address. FSBL 314 supports most user software load requirements.

Bitstream 322 includes FPGA configuration data for SSBL U-Boot 324, OS 326, and HACSP 328 startup and operation. Bitstream 322 can also include configuration data for the user application in some embodiments. In this case, HACSP 328 may boot up and run first before the user configuration is initiated. This type of configuration may be necessary for users with extensive real-time monitoring to allow registering of these monitoring activities with HACSP 328 for integrity reporting. Another use case is that once the HACSP 328 is operational, it can receive separate encrypted user bitstreams for partial FPGA configuration using SKAP security protocols (see, e.g., FIG. 13).

Second Stage Bootloader (SSBL) U-Boot 324 is open source software that runs on Zyng™ devices, and is commonly used to load Linux™ as OS 326. However, other SSBLs may be used without deviating from the scope of the invention depending on the PSoC and operating system that are used. Other U-Boot functions include reading DDR memory and erasing, reading, and writing NVM. U-Boot 324 is loaded by the FSBL. U-Boot 324 is used in both secure and non-secure boot, but is not required for either.

HACSP 328 provides an ARM TrustZone hardware extension. HACSP 328 provides a mechanism for building an arbitration layer between the "normal" world and the "secure" world. Continuous self-test integrity measurements are made, as well as SKAP quotes and SKAP update BootROM 312 represents an immutable RoT. FSBL 314 and Bitstream 322 represent additional components of the core RoT, and may leverage vendor-specific secure boot technology. U-Boot 324, OS 326, and HACSP 328 are non-vendor specific and extend the RoT to full TCB for HACSP secure operations in some embodiments.

Figure 4:
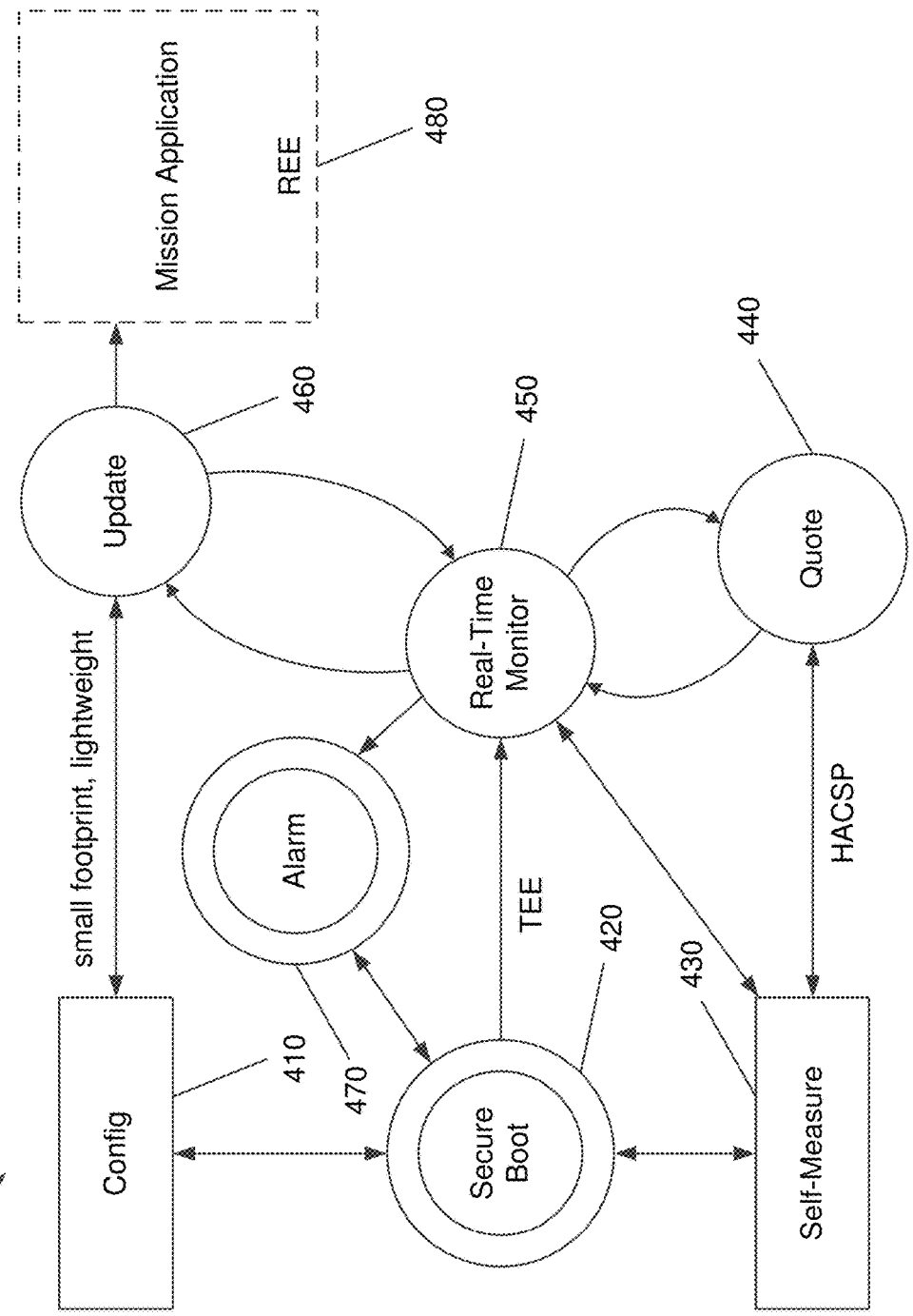
FIG. 4 is an architectural diagram illustrating a High Assurance Configuration Security Processor (HACSP) framework for an FPGA, according to an embodiment of the present invention.

FIG. 4 is an architectural diagram illustrating a HACSP framework 400, according to an embodiment of the present invention. The HACSP runs independent of mission application 480 in the REE and is designed to be non-blocking to mission application 480. In this embodiment, the HACSP is software executing in secure TEE world of TrustZone in ARM Core 0 of a Zynq 7000™ or any other suitable device. The HACSP provides trusted services for measure, update, and attestation for mission bitstream load/operations.

HACSP includes a real-time integrity monitor 450, which is a process that is continuously running, notionally in software either as part of a lightweight RTOS or as an internal super loop, in hardware as a Finite State Machine (FSM), or a combination thereof. This allows real-time monitor 450 to self-measure integrity and to respond in real-time to device alerts, e.g., by issuing an alarm 470. Real-time monitor 450 also invokes the update processor (update 460) when an update is requested, logging the update response and performing the same functions with quote 440. For further detail on updates 460 and quotes 440 by real-time monitor 450, see FIG. 13.

Secure Boot 420 captures the HACSP boot process shown in FIG. 3 involving BootROM 312, FSBL 314, bitstream 322, SSBL U-Boot 324, and OS 326. Config 410 represents the internal FPGA RAM configuration memory for logic and programming elements. Self-Measure 430 uses a secure reserved (through TrustZone) section of OCM used to store integrity measurements for quotes (e.g., quote 440).

Figure 5:
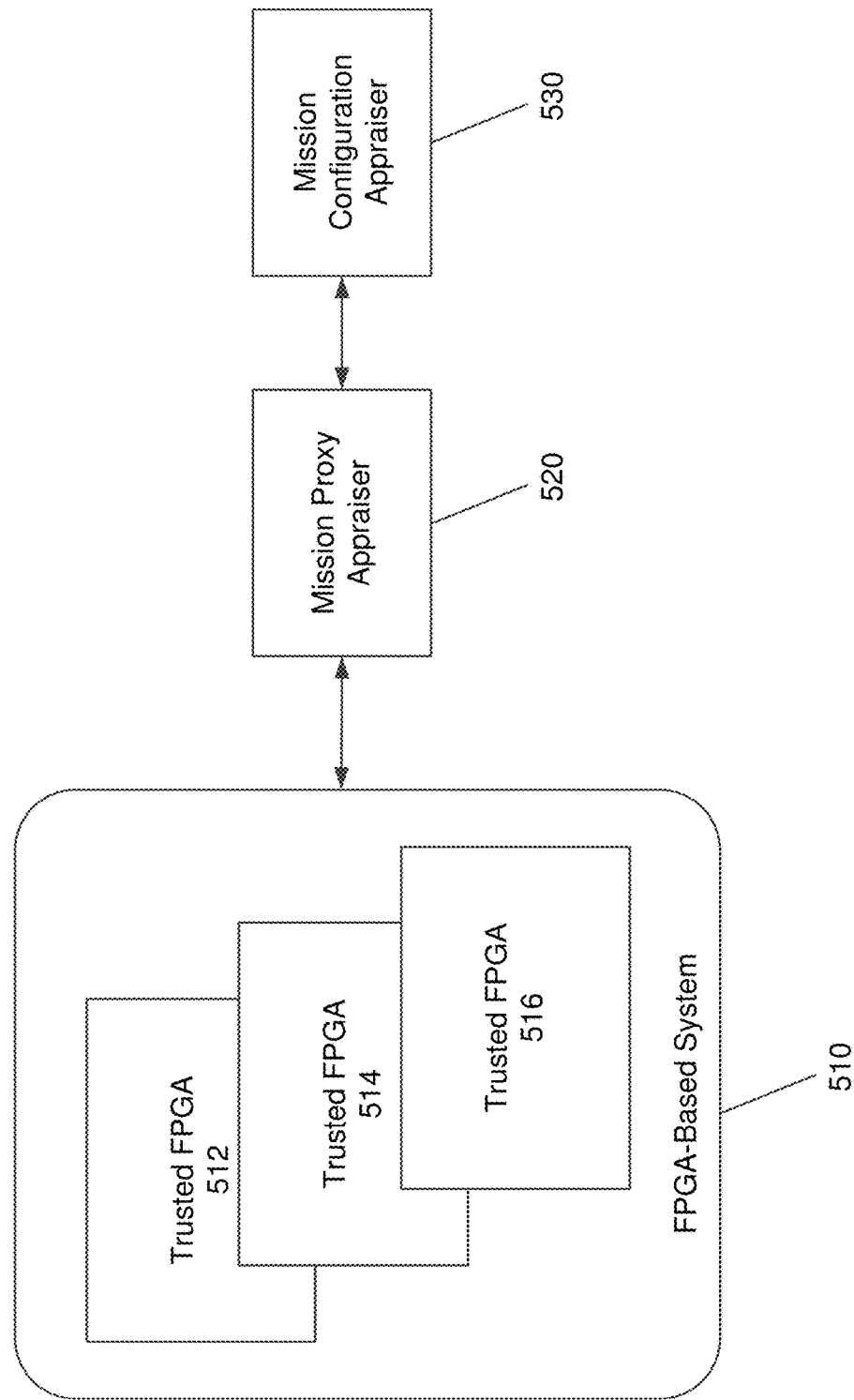
FIG. 5 is an architectural diagram illustrating a larger attestation/security architecture, according to an embodiment of the present invention.

FIG. 5 is an architectural diagram illustrating a larger mission-based attestation/security architecture 500, according to an embodiment of the present invention. In this embodiment, FPGA-based system 510 includes three FPGAs 512, 514, 516 that all have the HACSP framework of FIG. 4. However, any number of FPGAs may be used without deviating from the scope of the invention. A mission proxy appraiser 520 tasked with assessing mission assurance of FPGA-based system 510 receives attestation information (e.g., verification and reporting of bitstream authenticity) from FPGA-based system 510. A mission configuration appraiser 530 receives assurance reports from the mission proxy appraiser 520 to determine if a response is required in terms of reconfiguration or other directed actions to FPGA system 510.

Another view of a baseline FPGA trusted HACSP framework is shown in Table 1 below.

TABLE 1

BASELINE FPGA TRUSTED HACSP FRAMEWORK

| HACSP | Trojan Horse Detection | Environment Security Monitor | PUF | Vendor Specific Security IP |
|---|---|---|---|---|
| Real-time monitor with TEE | HMAC of all measurements done by HACSP to capture/quote FPGA state | | | |
| Secure Boot Core RoT for HACSP operation | Attestation SKAP security protocol attestation of quote | Temperature limits (SYSMON) | | |
| Alert and alarm conditions and subsequent FPGA actions | SKAP security protocol for remote bitstream update | Voltage limits (SYSMON) | | |
| | | Voltage glitch detection (SYSMON) JTAG backdoor (ICAP) HACSP software self-test | | |

The HACSP basic capabilities are filled in with the appropriate text. In this relatively basic form, the HACSP is designed to be non-blocking to a mission application. The HACSP can accept application-specific real-time monitoring extensions in some embodiments (shown as blank cells). These include certain functionality pertaining to hardware or software Trojan Horse Detection (THD), Environment Security Monitoring (ESM), Physical Unclonable Functions (PUF), and vendor-specific security IP integration.

Figure 6:
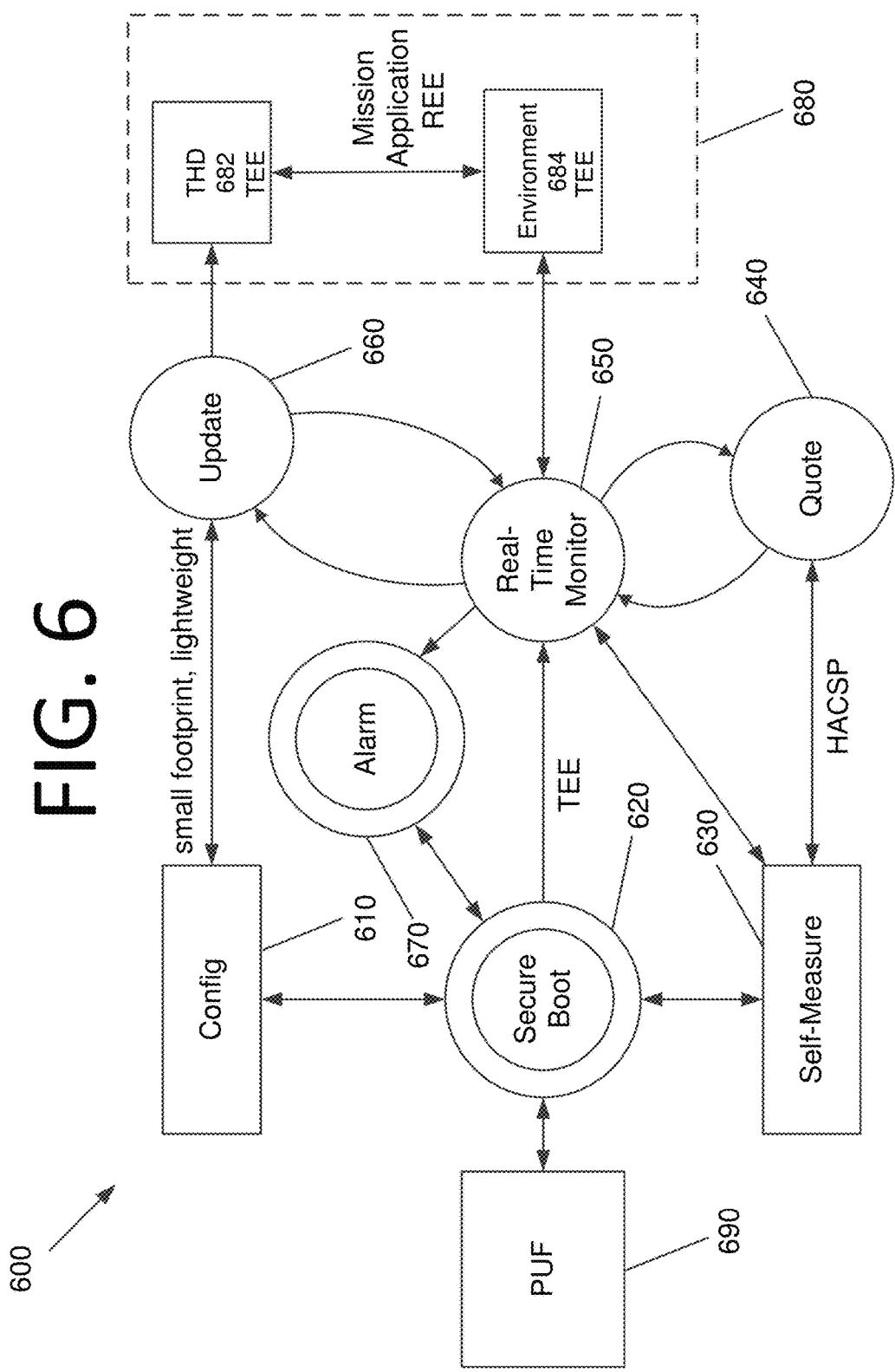
FIG. 6 is an architectural diagram illustrating a HACSP framework for an FPGA with enhanced real-time HACSP monitoring capabilities, according to an embodiment of the present invention.

FIG. 6 is an architectural diagram illustrating a HACSP framework 600 with enhanced real-time monitoring capabilities, according to an embodiment of the present invention. Similar to FIG. 4, HACSP includes a real-time integrity monitor 650, which is a process that is continuing running, notionally in software either as part of a lightweight RTOS or as an internal super loop, in hardware as a Finite State Machine (FSM), or a combination thereof. This allows real-time monitor 650 to self-measure integrity and to respond in real-time to device alerts, e.g., by issuing an alarm 670. Real-time monitor 650 also invokes the update processor (update 660) when an update is requested, logging the update response and performing the same functions with quote 640.

In this embodiment, real-time monitor 650 extends into mission application Rich Execution Environment (REE) 680 through a TrustZone to enable more precise monitoring of the REE. The extent of this operation may be set by the mission developer. This will typically use more of the FPGA resources, at the discretion of the mission developer, but also provides that user with a more comprehensive integrity monitoring capability. The user designed monitoring features may be registered with HACSP during bitstream programming HACSP framework 600 enhances HACSP framework 400 of FIG. 4 with an additional component set for device PUF identification—PUF 690. PUF 690 provides a device authentication randomizer and key generation. In other words, PUF is like device DNA that creates random numbers unique to the individual device. Mission application 680 has also been extended in this embodiment to include Trojan horse Hardware Detection (THD) 682 and a Trusted Execution Environment (TEE) Monitoring 684. Secure Boot 620 captures the HACSP boot process shown in FIG. 3 involving BootROM 312, FSBL 314, bitstream 322, SSBL U-Boot 324, and OS 326. Config 610 represents the internal FPGA RAM configuration memory for logic and programming elements. Self-Measure 630 is a secure reserved (through TrustZone) section of OCM used to store integrity measurements for quotes. Environment Monitoring TEE 684 is a hardware extension of HACSP Real Time Monitor 650 for environmental monitoring (see Table 2 for features) that may be custom configured to reside within Mission Application 680 and protected through TrustZone. Environment Monitoring TEE 684 may also be extended to interface to vendor-specific IP (see Table 2 for features). Trojan Horse Detection (THD) TEE 682 is a hardware extension of HACSP Real Time Monitor 650 for Trojan horse detection (see Table 2 for features) that may be custom-configured to reside within Mission Application 680 and protected through TrustZone.

Another view of an enhanced real-time HACSP framework is shown in Table 2 below.

flowcharts illustrating a non-interrupt process 700 for performing HACSP real-time monitoring (RTM) based on an RTM function call, according to an embodiment of the present invention. When an RTM function call occurs at 702, HACSP nominally checks reboot status at 704 to determine whether the boot is a reboot caused by a problem of interest. If so, and the error mandates an alert at 706, an alert handler

TABLE 2

ENHANCED FPGA TRUSTED HACSP FRAMEWORK

| | HACSP | Trojan Horse Detection | Environment Security Monitor | PUF | Vendor Specific Security IP |
|---|---|---|---|---|---|
| Real-time monitor with TEE | HMAC of all measurements done by HACSP to capture/quote FPGA state | Real-time current analysis | Tamper loop | Key generation, randomizer | SEMCON |
| Secure Boot Core RoT for HACSP operation | Attestation SKAP security protocol attestation of quote | Real-time timing analysis | Temperature limits (SYSMON) | Device authentication | Security supervisor IP |
| Alert and alarm conditions and subsequent FPGA actions | SKAP security protocol for remote bitstream update | Variant-based parallel redundant execution | Voltage limits (SYSMON) | | FPGA IP |
| | | watermark | Voltage glitch detection (SYSMON) | | |
| | | State machine timing analysis | Clock glitch detection | | |
| | | | JTAG backdoor (ICAP) Watchdog timer HACSP software self-test Processor-to-processor challenge/response | | |

The HACSP in some embodiments can accept application specific real-time monitoring extensions tailored to the specific mission cyber protections needs. These may include, but are not limited to, THD, environment security monitoring, PUF, and/or vendor-specific IP integration. More FPGA resources will typically need to be consumed by HACSP in the enhanced form. Additional capabilities may also increase the level of blocking of mission applications.

Some embodiments include an interrupt portion of code and a non-interrupt portion of code. The interrupt portion of code responds in real-time to critical interrupt-driven error conditions (see FIG. 8). The non-interrupt section of code works in near real-time to support quotes, lower impact anomalies, and service update and quote processes (See FIGS. 7A and 7B).

Figure 7A:
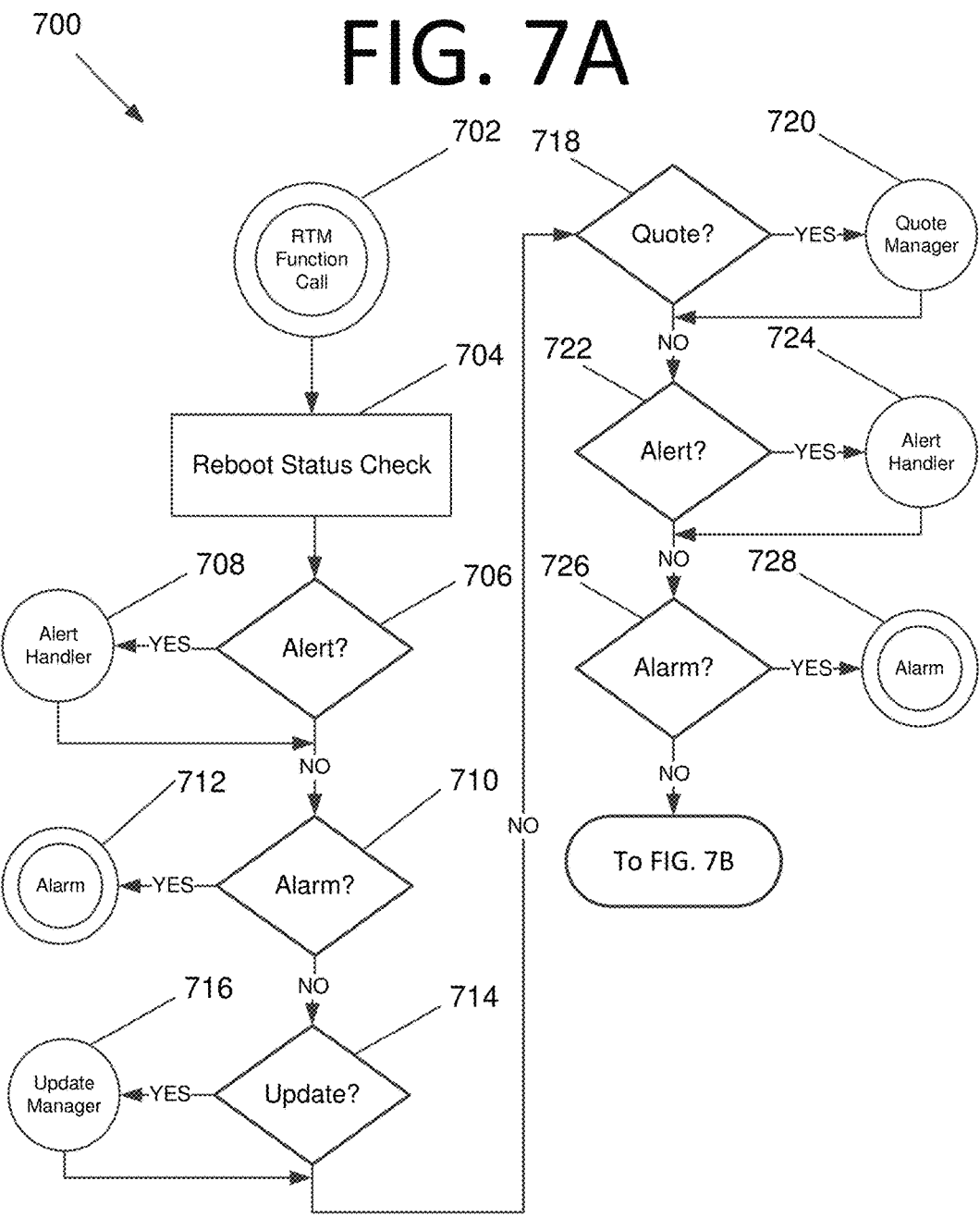

Non-interrupt processes of HACSP may not be in real-time, but may be time critical. FIGS. 7A and 7B are issues the alert at 708. Otherwise, if the error is sufficient to mandate an alarm at 710, an alarm is issued at 712.

HACSP determines whether an update is pending at 714. If so, an update manager 716 provides the update. HACSP then determines whether a quote request is pending at 718. If so, the quote request process is performed by the quote manager at 720.

If an error occurs in these steps, and the error mandates an alert at 722, an alert handler issues an alert at 724. Otherwise, if the error is sufficient to mandate an alarm at 726, an alarm is issued at 728. If no alarm is mandated, the process continues to FIG. 7B.

In FIG. 7B, HACSP does the process of integrity measurements hashing for bitstreams and configurations. Included are bitstream hashes as acquired earlier by HACSP. For instance, the PL peripheral control registers hash is obtained at 730, the PL address control registers hash is obtained at 732, the PL memory configuration hash is obtained at 734, the HACSP bitstream hash is obtained at 736, the TrustZone configuration hash is obtained at 738, and the device DNA hash is obtained at 740. A user-specific measurement process with hash is performed at 742 and a user bitstream hash is performed at 744. Steps denoted in gray in FIG. 7B are user-specific. User bitstreams (as part of update 660 in FIG. 6 or update 460 in FIG. 4, for example) may be hashed and included in computation of extended hash quote to be reported at 748. User-specific measure processes 742 (as part of 6 Environment Monitoring TEE 684 and THD TEE 682 in FIG. 6, for example) that the user has incorporated as registered specific integrity checks are measured may be hashed and included in computation of an extended hash quote to be reported at 748.

Device environment variables are also measured and hashed at 746 and updated as part of the extended hash quote to be reported at 748. The software watchdog timer is then reset before the function returns at 752, and subsequently repeats operation of the loop.

Critical interrupts can occur from a number of sources, including, but not limited to, a tamper detection loop being broken, program logic fabric memory causing a CRC error, a watchdog timer timeout, a supply voltage or device temperature exceeding a threshold, a user-designated integrity base interrupt deemed critical for ensuring trusted mission operation, etc. Interrupts may be evaluated against an alarm and alert for proper response. Alerts may be reported in quotes, and a number of common alerts may proceed an alarm condition. Alerts leave with interrupt clear and operation continuing. An alarm condition disables the part and requires a reset to the part to restore operation in some embodiments.

FIG. 8 is a flowchart illustrating a process 800 for performing HACSP RTM based on an interrupt, according to an embodiment of the present invention. The process begins with receiving an interrupt at 802. If tampering is detected at 804, an alarm is issued at 806. Otherwise, the software watchdog timeout is checked at 808, the PL configuration memory Cyclical Redundant Code (CRC) error is checked at 810, temperature/voltage threshold limits are checked at 812, and user-defined critical error(s) are checked at 814. If a combination of alerts is severe enough at 816, an alarm is issued at 806. Otherwise, if alerts exist at 818, these are provided to an alert handler for processing at 820. The interrupt source is then cleared at 822 and the interrupt returns at 824.

Real-Time Monitoring Considerations

The current state-of-the-art for attestation is to compose a signature with an attestation key over the software measurement and report on boot up and/or on demand, often stopping the running process to measure state. This this type of static bitstream integrity measurement as a true representation of an FPGA's dynamic continued state can be misleading. For example, cyberattacks conducted using dynamically triggered malware would likely be activated between software and firmware updates.

What is technically lacking in current RoT is a real-time integrity measurement of the actual bitstream run-time performance against what is expected without stopping operation. The HACSP measurement capability of some embodiments can be extended to real-time monitoring, the level of which is at the discretion of the user. For run-time monitoring, more FPGA resources will likely need to be consumed by HACSP. Additional capabilities may increase the level of blocking of mission applications as more resources are allocated to the HACSP in the TEE environment.

Figure 9:
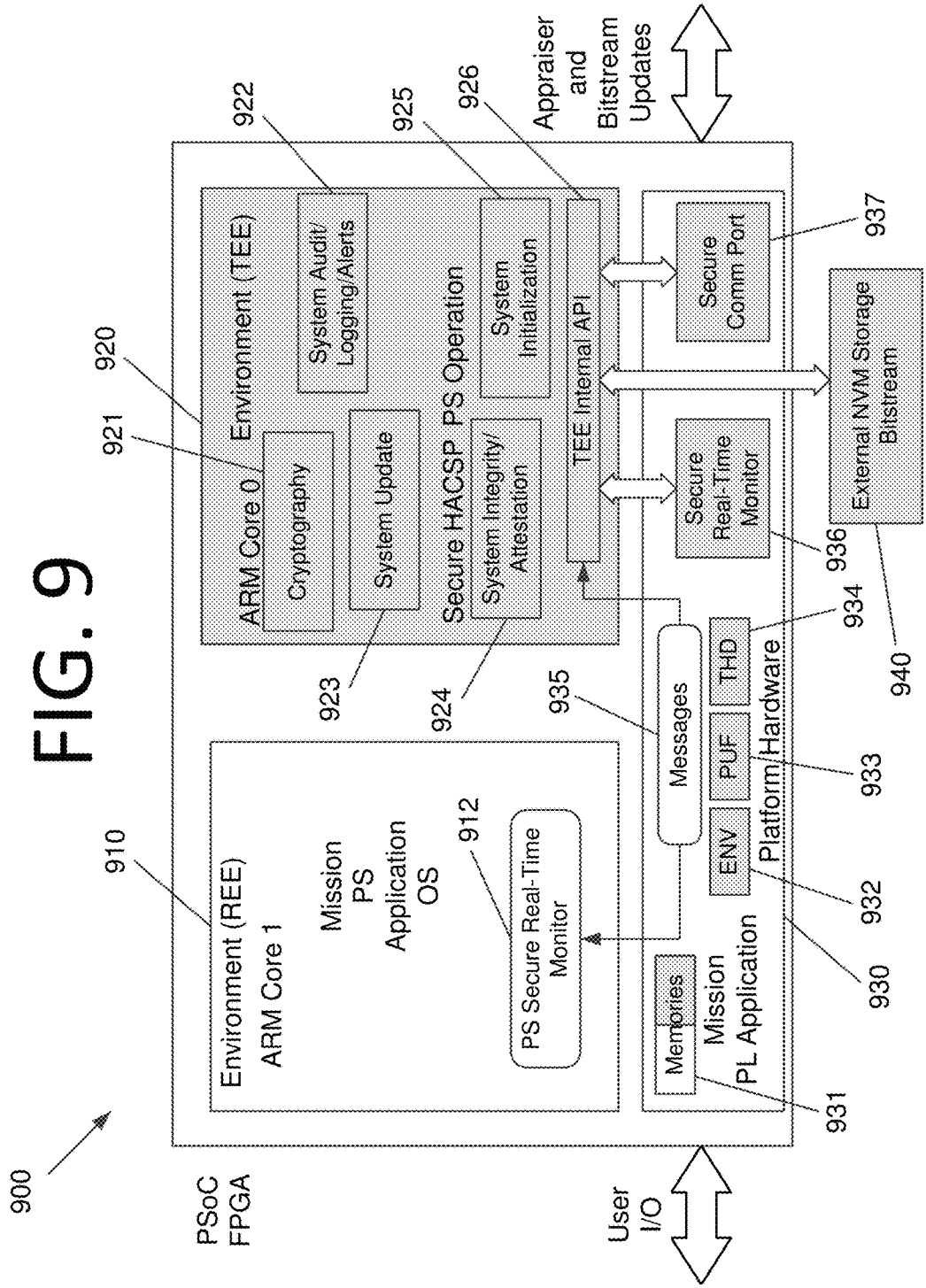
FIG. 9 is a block diagram illustrating an enhanced baseline HACSP architecture, according to an embodiment of the present invention.

FIG. 9 is a block diagram illustrating an enhanced baseline HACSP architecture 900, according to an embodiment of the present invention. The HACSP has been implemented within a commercial FPGA architecture/device in this embodiment, which is also connected to an authenticated external NVM storage bitstream 940. PL in the mission PL application of platform hardware 930 refers to the programmable logic fabric of the FPGA device. PS in REE 910 refers to the programmable system part of the FPGA architecture/device on ARM core 1. For this implementation, the HACSP primarily resides as a software operation in ARM Core 0. The trust mechanism used to separate HACSP from user application space is ARM TrustZone IBE 920. The HACSP secure areas using TEE separation are shown in gray. Through TEE functionality, the HACSP monitors user applications in software that runs in ARM core 1 (through a TEE secure internal API) and user hardware applications of platform hardware 930 that are running in the logic fabric through the HACSP real-time monitoring interface in the form of secure real-time monitor 936.

The HACSP connects directly to an outside appraiser through a TEE separated communications channel in the form of secure communications port 937 and to NVM through a specific NVM TEE separated interface in the form of TEE internal API 926. The FPGA is powered up and securely booted using vendor-specific hardware to encrypt and authenticate the HACSP bitstream that was stored in external NVM. To accommodate this vendor process, the FPGA should be preconfigured with a "secret key."

Once operating, the HACSP proceeds with integrity measurements on itself, internal memory checks for error, local environment checks, and use of the specific part ID to ascertain trust via system integrity/attestation 924. The HACSP then begins to upload its secure report on its own trustworthiness to a remote appraiser. If successful, the HACSP then proceeds to accept user bitstream updates or conduct local load from its co-located authenticated NVM. All bitstream loads are both preceded and completed with an integrity measurement to enable a secure upload report.

In FIG. 9, ARM Core 0 of TEE 920 is dedicated as the processing component of the HACSP. The processing includes key software functional components cryptography 921, system audit/logging/alerts 922, system update 923, system integrity/attestation 924, and system initialization 925. The HACSP also has logic for input/output illustrated by secure real-time monitor interface 936, secure comm port interface 937, and external NVM interface 940. These hardware/software components operate in platform hardware 930 in secure isolation from user REE processing environment 910 using TEE environment 920. Dedicated ARM core 1 provides processing for user REE processing environment 910.

Note that OCM 931 is also divided between TEE 920 (gray) and REE 910 (white). The intent is to have both environments coexist and operate independently without interference unless there is a detected trust issue. One of the primary intents of the HACSP in some embodiments is to not constrain the user application either in program or logic as long as user operations are deemed trustworthy. Extended interfaces between environments are in place to facilitate custom real-time monitoring of operation of REE 910 by the HACSP in TEE 920. One interface is PS secure real-time monitor 912 to TEE internal API 926 to allow the HACSP to challenge and accept responses to REE 910 for integrity checking. User PL interfaces include ENV 930, PUF 933, and THD 934 to allow for custom environmental monitoring, PUF functionality, and Trojan horse detection, respectively, of user REE logic environment 910 within platform hardware 930.

Figure 10:
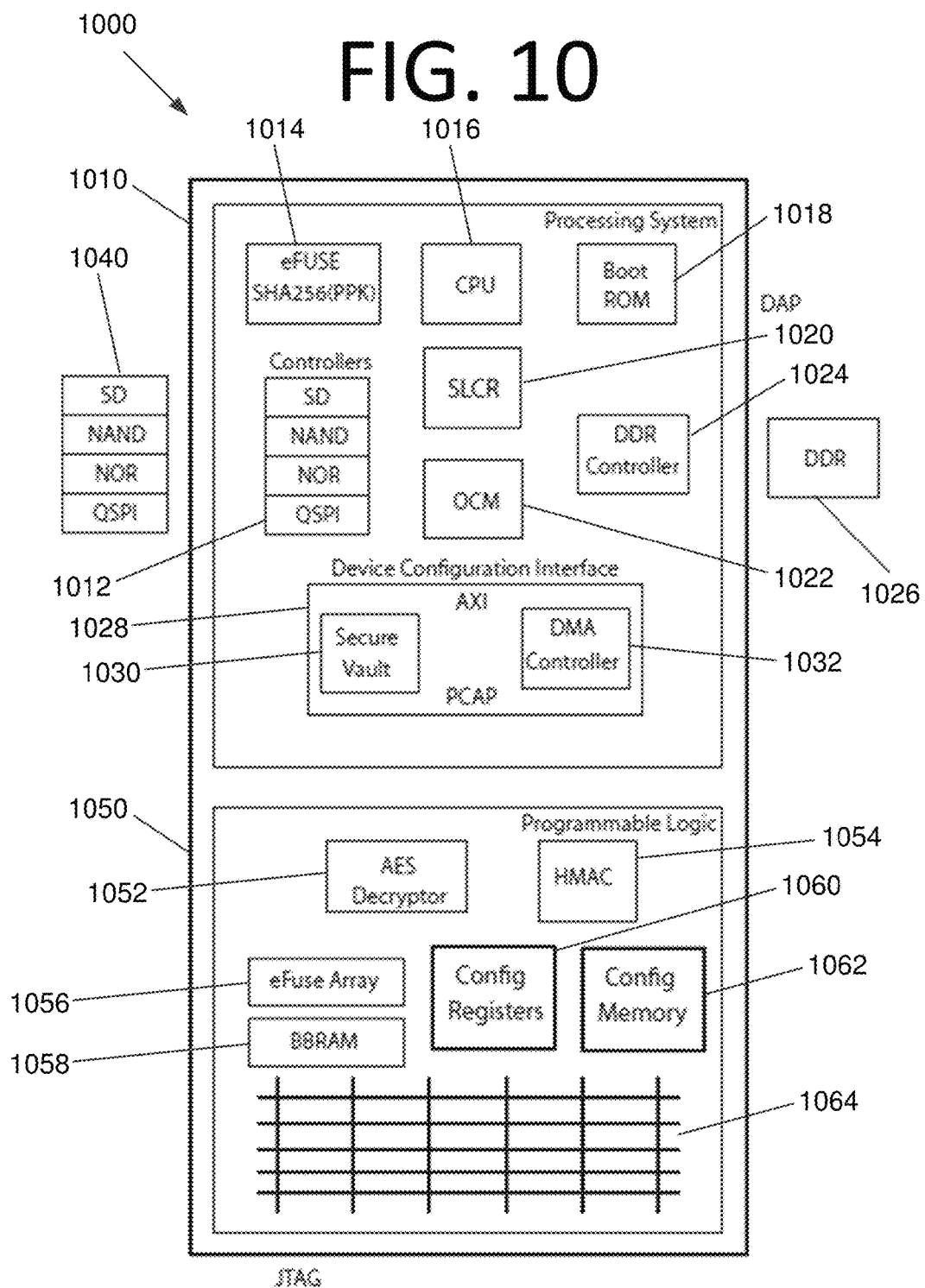
FIG. 10 is a block diagram illustrating a Zynq-7000 AP™ SoC that may run HACSP, according to an embodiment of the present invention.

FIG. 10 is a block diagram illustrating a Zynq-7000 AP™ SoC 1000 that may run HACSP, according to an embodiment of the present invention. However, it should be appreciated that any suitable SoC may be used without deviating from the scope of the invention. The hardware components illustrated in FIG. 10 may be used in boot. SoC 1000 includes a processing system 1010 and programmable logic 1050. SoC 1000 also has access to external NVM 1040, which may include, but is not limited to, Secure Digital (SD), Quad Serial Peripheral Interface (QSPI), NAND (Negative-AND), and/or NOR (Negative-OR). Controllers 1012 interface with external NVM 1040.

eFUSE 1014 allows for the dynamic real-time reprogramming of SoC 1000. SoC 1000 also includes a Central Processing Unit (CPU) 1016 with multiple cores. For instance, ARM Cortex-A9 CPU0 may be used for boot. BootROM 1018 is 128K mask programmed boot Read Only Memory (BootROM) that contains the BootROM code. System Level Control Register (SLCR) 1020 includes approximately 150 registers. The registers used in boot are the Boot Mode. On-Chip Memory (OCM) 1022 provides secure storage.

DDR controller 1024 accesses external DDR RAM 1026. A device configuration interface 1028 includes a secure vault 1030 and a Direct Memory Access (DMA) controller 1032. DMA controller 1032 is used in boot.

SoC 1000 also includes programmable logic 1050 with an AES decryptor 1052 and HMAC 1054. PL eFuse array 1056 is on chip One-Time-Programmable (OTP) NVM. Battery Backed RAM (BBRAM) 1058 is an on-chip alternative to eFUSE. Programmable logic 1050 further includes configuration registers 1060, configuration memory 1062, and programmable logic fabric 1064.

Figure 11:
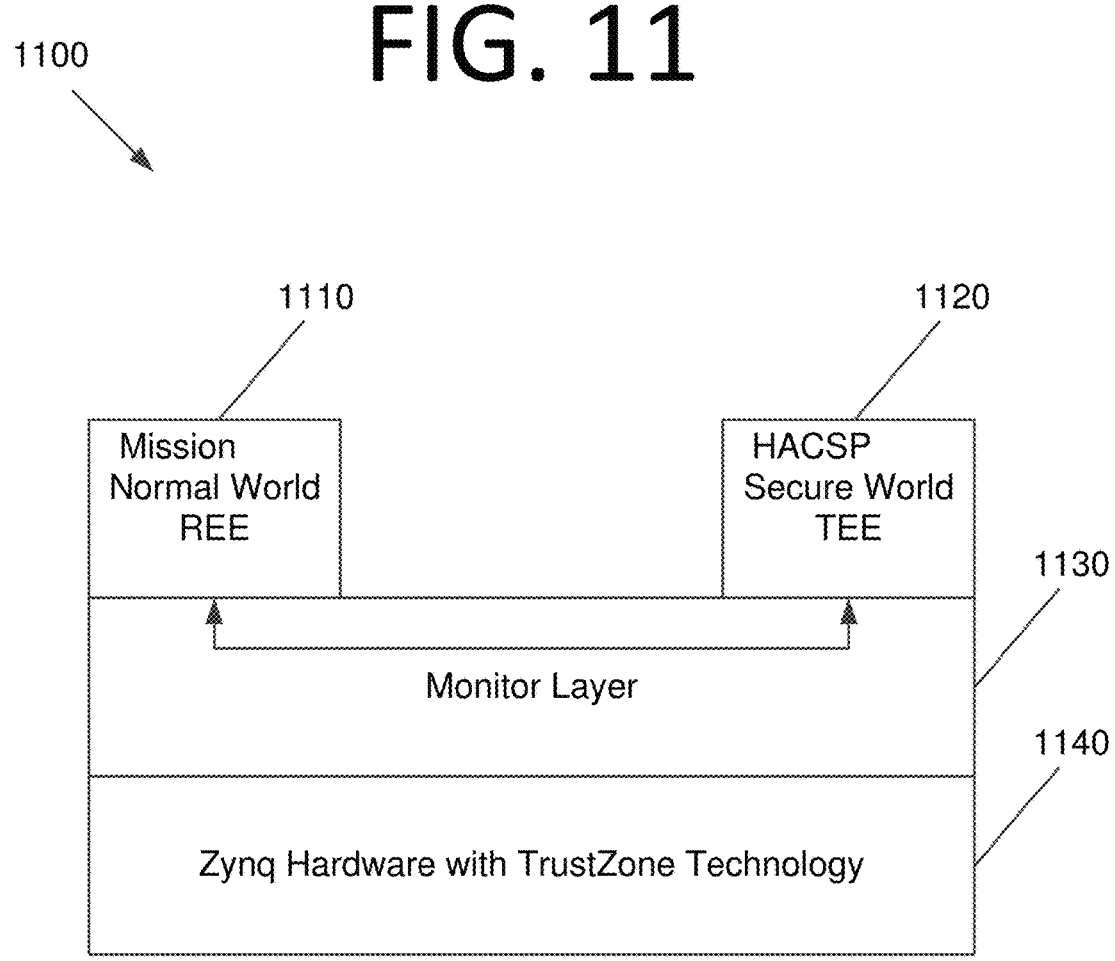
FIG. 11 is an architectural diagram illustrating a TrustZone/TEE implementation for establishing a trusted, isolated execution environment for HACSP, according to an embodiment of the present invention.

FIG. 11 is an architectural diagram illustrating a TrustZone/TEE implementation 1100 for establishing a trusted, isolated execution environment for HACSP, according to an embodiment of the present invention. ARM does not specify RoT for TrustZone. Rather, the technology relies on RoT that the HACSP has embodied as a larger chain of trust (see, e.g., BootROM 312, FSBL 314, SSBL U-Boot 324, and OS 326 in FIG. 3).

HACSP provides an ARM hardware extension to secure world TEE 1120. An extra bit is set for execution in monitor mode (NS bit) in some embodiments. This may be propagated through the system bus to all hardware resources. HACSP also provides a mechanism for building a monitor layer 1130 to isolate execution environments, i.e., normal world REE 1110 and secure world TEE 1120. A set of hardware security extensions for ARM SoC cover the processor(s), memory, and peripherals. A TrustZone Address Space Controller (TZASC) may configure partitions of DRAM. A TrustZone Memory Adapter (TZMA) may configure partitions of OCM. A TrustZone Peripheral Controller (TZPC) may configure partitions for peripherals.

Zynq™ hardware with TrustZone 1140 is configured as part of the HACSP bitstream (see, e.g., bitstream 322 of FIG. 3) with fixed hardware assignments for trusted HACSP hardware component separation (e.g., memory, processor, I/O, etc.). Monitor layer 1130 resides on top of Zynq™ Hardware with TrustZone 1140. Consequently, if a non-secure element attempts to access a secure element, the access will be denied and monitor layer 1130 will generate an error that will be intercepted by the HACSP interrupt process (see, e.g., tamper 804 of FIG. 8).

Figure 12:
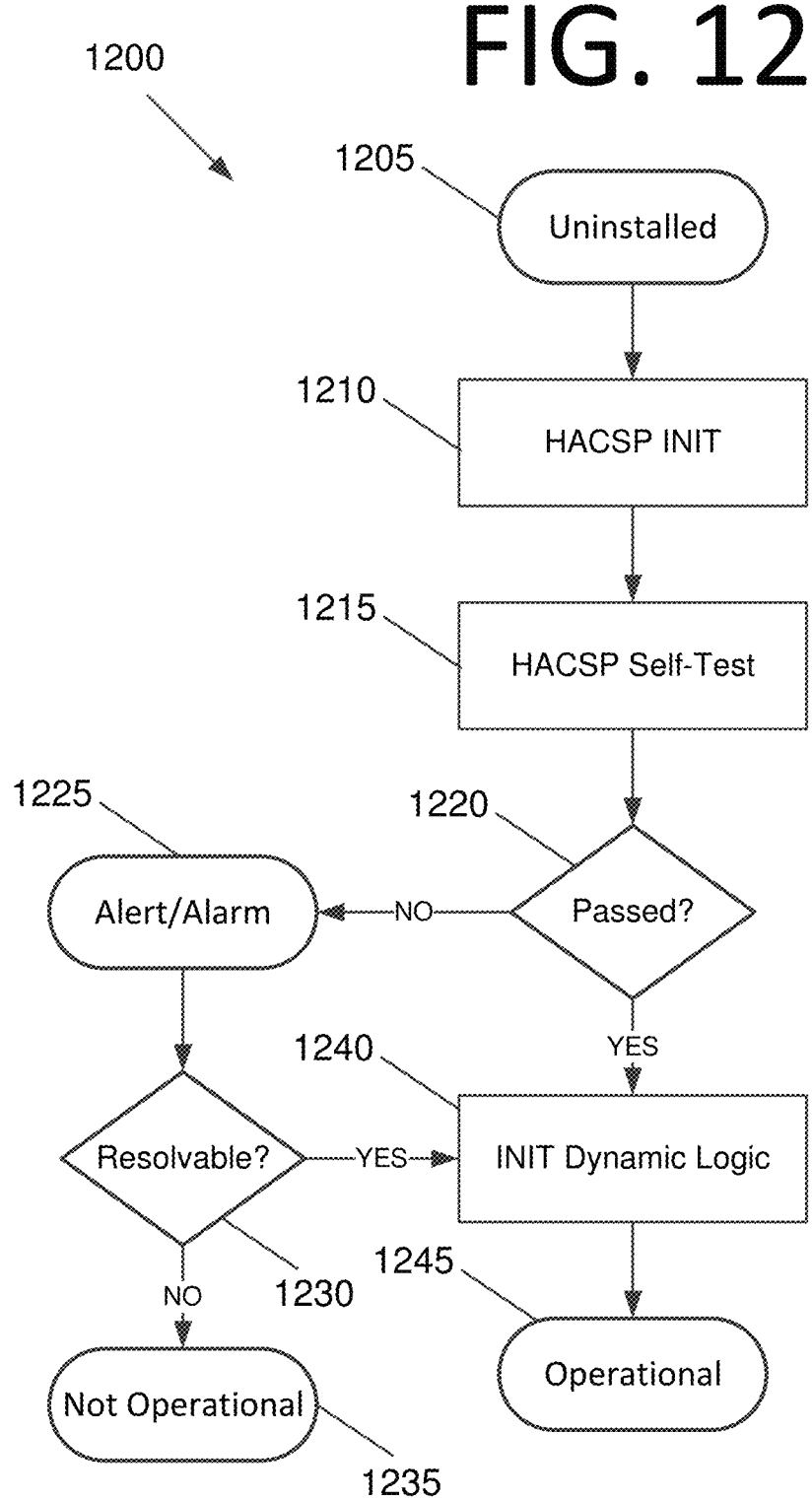
FIG. 12 is a high level flowchart illustrating a HACSP secure boot RoT, according to an embodiment of the present invention.

FIG. 12 is a high level flowchart 1200 illustrating a HACSP secure boot RoT, according to an embodiment of the present invention. The process begins with HACSP in an uninstalled state at 1205. The HACSP is then initialized at 1210 by loading an initial bitstream (e.g., the Xilinx™ chain of trust). A HACSP self-test is then run at 1215 to verify the initial bitstream with a reference in NVM and the measurement is then stored (e.g., in register BCR#0). Attestation measurements are also performed.

If the self-test does not pass at 1220, an alert or alarm is provided at 1225. If an Alert Condition occurs (this is less severe than an alarm), the HACSP will store the occurrence in NVM for reporting. Depending on the frequency or condition of the alert, the HACSP will take actions that, if a combination of alerts is severe enough, will result in an alarm. Whereas alerts are resolvable at 1230, alarms are not, and the HACSP is not operational for the mission at 1235. Additionally, the entire device may be placed in a lockdown state such that the entire device is not operational at 1235. For alarm conditions the following may occur: (1) zeroization key; (2) data zeroization; (3) configuration zeroization; and (4) global outputs clear/reset.

If the self-test passes at 1220 or the alert is resolvable at 1230, dynamic logic is initialized at 1240. More specifically, partial bitstreams are loaded, partial configurations are measured, and measurements are stored (e.g., in BCR#n). HACSP is then operational at 1245 and commands can be accepted.

The baseline HACSP operations in some embodiments are integrity measurement and attestation. Integrity measurement includes computation of the hash value of all configurations loaded onto the system. Attestation includes trustworthy reporting of the system behavior to a challenger, such as an update server during an update process.

Figure 13:
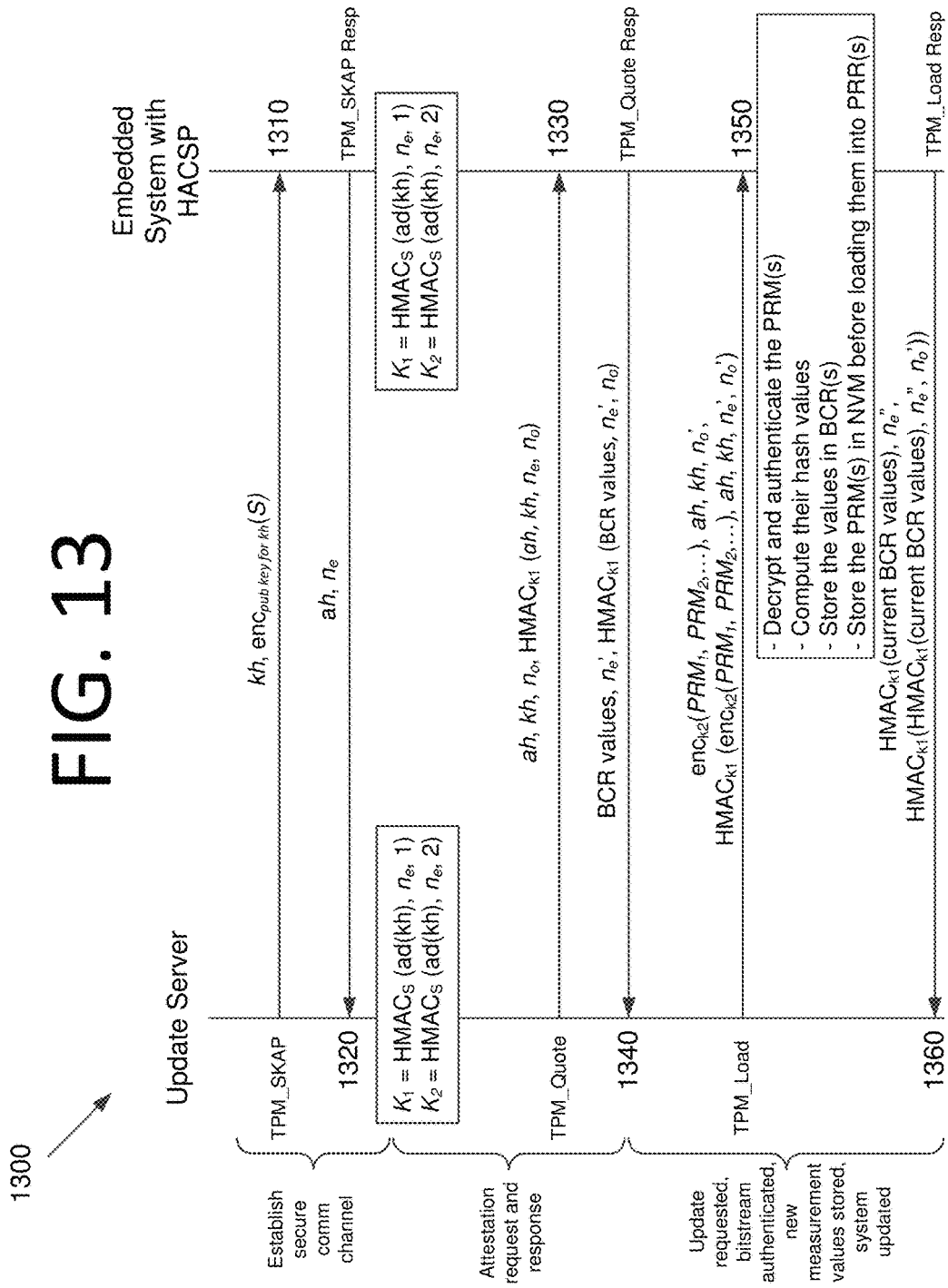
FIG. 13 is a flow diagram illustrating an update/quote protocol, according to an embodiment of the present invention.

FIG. 13 is a flow diagram illustrating an update/quote protocol 1300, according to an embodiment of the present invention. Update/quote protocol 1300 in this embodiment is based on SKAP for TinyTPM. It may be changed/adapted using RSA and Light Weight Cyber SPECK instead of AES for HACSP in some embodiments.

The specific details in FIG. 13 represent one embodiment of the invention. The specified details are for explanatory purposes and are not intended to limit design embodiments or variations, which are within the scope of the invention. For example, alternative embodiments of the invention may replace the specific cryptographic primitives with suitable alternatives without deviating from the scope of the invention. The specific information included in messages may also vary from one embodiment to another.

The SKAP protocol adapted for HACSP consists of 6 messages between two sides—the update server and the HACSP. When the update server initiates contact with the HACSP via TPM_SKAP message 1310, it sends a key handle (kh) and a secret session value (S). kh is a value associated with a key stored within the HACSP. In some embodiments, S is encrypted with RSA using a public key associated with kh, and the encryption and decryption of S are the only times that the public key crypto is used in the process. Other embodiments may use another suitable public key cipher instead of RSA. S is used to help derive the keys $k_1$ and $k_2$.

The HACSP responds with a TPM_SKAP response with an authorization handle (ah), which is a session ID number. The update server includes the ah when messaging the HACSP for the rest of the session. The HACSP also includes $n_e$ in the response. $n_e$ is the even nonce, a randomly generated number used to prevent replay attacks. "Even nonce"

refers to nonces generated by the HACSP (not necessarily an even number), while "odd nonce" refers to nonces generated by the update server (not necessarily an odd number). In some embodiments, $k_1$, and $k_2$ are keys that are generated via a keyed-hash message authentication code (HMAC) of the authentication data that kh points to (authdata or ad(kh)), the even nonce, and a constant: $k_1$=HMAC$_s$(ad(kh), $n_e$, 1) and $k_2$=HMAC$_s$(ad(kh), $n_e$, 2). Note that the specific formulas for generating $k_1$ and $k_2$ are provided by way of example only and may be replaced with another suitable key generation algorithm without deviating from the scope of the invention.

The TPM_Quote message 1330 includes $n_o$. $n_o$ is a random nonce that the update server generates. In TPM_Quote response 1340, the BCR values are one or more registers stored in the HACSP that are used to measure the current and previous states of the HACSP. Sending HMAC$_{k1}$ (BCR values) keeps a "man in the middle" from meddling with values. Also, $n_e'$ is a new nonce. Options for generating new nonces include a new random number or $n_e'=n_e+1$.

In TPM_Load 1350, enc$_{k2}$(PRM$_1$, PRM$_2$, . . . ) is an encrypted bitstream (or possibly other software) that will be used to update the device. TPM_Load response 1360 includes HMAC$_{k1}$(current BCR values). HMAC$_{k1}$(current BCR values) is an HMAC of the BCR states after receiving the new bitstream.

Cryptographic Primitives

The crypto functionality of the HACSP is built on top of the SPECK family of block ciphers in some embodiments (more specifically, SPECK with 128-bit blocks and a 256-bit key). SPECK is a lightweight block cipher, which gives it several advantages over a more general cipher like AES. For instance, SPECK is faster than AES. This is especially important on the HACSP device, which is likely in an environment where low SWaP (size, weight, and power) requirements are desirable. SPECK also requires less memory than AES. This helps to minimize the overhead of securing the device, leaving more resources available to the user. The HACSP uses SPECK for regular block encryption in some embodiments, e.g., when encrypting a bitstream to send. SPECK is also used as the core of a hash function by wrapping it in the Davies-Meyer one-way compression function in some embodiments. That hash function may be used to create an HMAC following the RFC 2104 definition.

Using TinyTPM and SKAP provides an efficient way to add secure update capabilities to HACSP. Instead of a full-on TPM, only a handful of messages need to be supported. However, it is straightforward to expand the catalog of allowed messages to support new requirements. SKAP immediately sends a secret (encrypted with a public key) used to generate symmetric encryption keys, minimizing the amount of (slow) public key crypto while also letting the update server and HACSP verify each other.

Integrity Monitoring

In some embodiments, a System Watchdog Timer (SWDT) can be clocked by PL and PS can be used to reset SWDT. This allows for effective monitoring of PS clocks. SWDT Timeouts may create an interrupt to the PS or a system reset. An internal oscillator in the PL, such a CFG-MCLK, may be used to determine if the PS clock has halted or severely slowed and respond with a PS interrupt (assuming PS is able to respond) or a system reset. SWDT reset may be indicated in the slcr.REBOOT_STATUS register such that the incident is reported to the next boot cycle Different scenarios may warrant different responses. For instance, some alarms/alerts may justify a system reset. The type of system reset may depend on the type and severity of the event prompting the alarm/alert. A secure lockdown may be internally triggered that requires a power-on reset (POR) before the device can be used again. A POR requires an external reset signal. During a POR, all internal data (including PL configuration) is erased except for eFUSEs and the BBRAM storing a key. A non-POR may be internally triggered and erases most internal data, but preserves the eFUSE, BBRAM, and select register data (e.g., reboot status and multi-boot address registers). In addition to resets, BBRAM data can be erased. Less drastic responses may include erasing part of the device (e.g., a subset of software or PL logic) and/or reloading content to that part of the device.

One-Time Integrity Monitor Tasks

One-time integrity monitor tasks may include checking the reboot status register, such as slcr.REBOOT_STATUS to determine if boot is a reboot caused by a problem of interest (e.g., a SWDT timeout). The device DNA and user eFUSE may also be checked to identify device. This may not be appropriate in some embodiments. Secure boot implies that the device is authorized, but device DNA and user eFUSE give extra layers of protection. Tampering may cause boot-time checks to be skipped (clock glitching). Periodic (background) checks make it difficult or impossible for an adversary to consistently skip checks.

Alarms may also be produced for high and low temperature and voltage thresholds. Alarms may be asserted only when values are beyond the thresholds. PL configuration memory CRC errors may also be checked.

Background Integrity Monitor Tasks

The background integrity monitor may periodically poll for alarms or readings. For instance, alarms may also be produced for high and low temperature and voltage thresholds. Alarms may be asserted only when values are beyond the thresholds. The SWDT may also be periodically reset.

PL configuration memory CRC polling may be performed, and a PL configuration memory cryptographic hash may be performed manually. Configuration memory may be provided by a frame, a set of frames, and/or Partial Reconfiguration Regions (PRRs). For memory, runtime quotes may be performed for comparison against baseline quotes. The baseline may be based on a disk image and/or a quote taken while the system is in a "good" state.

Readable memory may be divided for individual quotes. This may be faster for each individual quote, but requires more numerous measurements. The location of the detected problem should also be identified Handling of dynamic content should be considered.

BBRAM may store an AES key. An invalid key may indicate tampering. BBRAM is not readable, and uses a plaintext-ciphertext pair for a Known Answer Test (KAT).

Principles Of Remote Attestation

Principle 1—Fresh Information: Assertions about the target should reflect the running system.

Principle 2—Comprehensive Information: Attestation mechanisms should be capable of delivering comprehensive information about the target, and its full internal state should be accessible to local measurement tools.

Principle 3—Constrained Disclosure: A target should be able to enforce policies governing which measurements are sent to each appraiser.

Principle 4—Semantic Explicitness: The semantic content of attestations should be explicitly presented in logical form.

Principle 5—Trustworthy Mechanism: Appraisers should receive evidence of the trustworthiness of the attestation mechanisms on which they rely.

The HACSP may include one or more user-configured runtime integrity monitoring systems. The HACSP system may be implemented as software running in a processor or TEE, programmable logic, or hard logic. The HACSP system may respond to alarms or alerts of possible software or hardware Trojan horse or tampering activity. The HACSP system may also provide a limited API that provides user code with access to system status information. This status information may include information about alarms/alerts and/or system quotes. Examples include, but are not limited to, internal analog-to-digital converters (ADCs), voltage monitors, and temperature sensors.

PUFs can support identification, authentication, and random number generation functionality. PUFs can be the basis for cryptographic key generation (repeatable and non-repeatable key generation). The HACSP may be implemented on a device with a PUF implemented in hard logic in some embodiments. The HACSP may also implement a PUF in programmable logic. Information from the PUF may be included in system quotes.

The space industry is undergoing several major paradigm shifts that will challenge the trustworthiness of space operation and may create an opportunity for HACSP to be of significant benefit. One of these shifts is the move to the use of foreign launch and foreign payload platforms (i.e., "host payload") by the U.S. government and commercial space activities. This situation raises issues associated with trust and integrity of space host payload operation that HACSP may directly solve in some embodiments. Another critical shift is the use of less expensive and more readily available small satellites (e.g., "cubesats") that are SWaP constrained and can be grouped as a distributed cyber-physical space payload. Here again, the HACSP of some embodiments, with both lightweight implementation and the accommodation of dynamic on demand attestation principles, may directly represent a trust solution in these space applications.

FIG. 14 is a flowchart 1400 illustrating a process for a HACSP for an FPGA, according to an embodiment of the present invention. The process begins by ensuring security of a user application bitstream load and update during FPGA configuration at 1410. In some embodiments, the HACSP is implemented as a trusted system application for the FPGA. Security mechanisms for independent secure trusted attestation and integrity measurement mechanisms are implemented at 1420. Reporting and reliable evidence about trustworthiness of the FPGA are provided during user bitstream execution without stopping operation and between load and updates at 1430.

The HACSP may implement a secure, verifiable RoT for FPGA loading, boot-up, initialization, configuration, and during operation. Security mechanisms may be implemented for independent secure trusted attestation and integrity measurement mechanisms to report and provide reliable evidence about trustworthiness of the FPGA during user bitstream execution without stopping operation and between load and updates, for secure continuous real-time monitoring of both its own operation and user software execution, for secure continuous real-time internal monitoring of the FPGA environment, for secure continuous real-time internal monitoring of user bitstream execution, for secure audit/log to track its key, operations, alerts, and execution control alternatives incurred during HACSP operation, for secure attestation to a remote system security appraiser on its operational status and the status of a user system using secure light cryptography and attestation protocols, or any combination thereof.

The HACSP may autonomously alarm to a safe state based on one or more measurements that reveal critical malfunctions in FPGA operations or an active tamper condition. The safe state may include locking down all user operations, but retaining HACSP communication to allow updates for reconfiguration and quotes to provide integrity reports to support appraiser assessment, analysis, and corrective response to malfunction or attack. The HACSP may receive configuration data for the HACSP and a user application, use the HACSP configuration data to boot up and run and subsequently initiate a user configuration using the user application configuration data. The HACSP may register user application monitoring activities for user-specific integrity reporting. After the HACSP is operational, it may receive separate encrypted user bitstreams for partial FPGA configuration using SKAP.

The HACSP may provide a mechanism for building an arbitration layer between a non-secure REE and a secure TEE. The HACSP may run independently of a mission application in the REE. The HACSP may be non-blocking to the mission application.

The HACSP may perform trusted services for measure, update, and attestation, by the HACSP, for mission bitstream load/operations. The trusted services for measure, update, and attestation may be performed in real-time. The HACSP may self-measure integrity and respond in real-time to FPGA alerts via a real-time integrity monitor process that is continuously running The real-time integrity monitor may invoke updates, logging update responses, invoking quotes, and logging quote responses.

In some embodiments, the HACSP may transmit attestation information to a mission proxy appraiser. The attestation information may include verification and reporting of bitstream authenticity. The HACSP may provide ESM functionality, THD functionality, PUFs providing a device authentication randomizer and key generation, or any combination thereof. A real-time monitor of the HACSP may extend into a mission application REE through a TrustZone to enable more precise monitoring of the REE THD, ESM, or both.

The HACSP may provide near real-time monitoring to support quotes, lower impact anomalies, and service update and quote processes. In some embodiments, the HACSP may initiate a real-time monitoring function and check a reboot status to determine whether a reboot is caused by an error. When the reboot caused the error, and the error mandates an alert, the HACSP may issue the alert. When the error is sufficient to mandate an alarm, the HACSP may issue the alarm. The HACSP may also reset a software watchdog timer before the real-time monitoring function returns.

In some embodiments, the HACSP may perform integrity measurements hashing for bitstreams and configurations. The HACSP may obtain a PL peripheral control registers hash, a PL address control registers hash, a PL memory configuration hash, a HACSP bitstream hash, a TrustZone configuration hash, a FPGA DNA hash, and a user eFUSE hash. The HACSP may also perform a user-specific measurement process with hash and a user bitstream hash.

The HACSP may hash user bitstreams and compute an extended hash quote including the hashed user bitstreams. The computing of the extended hash quote may include user-specific measure processes that the user has incorporated as registered specific integrity checks are measured. Device environment variables are measured, hashed, and updated as part of the extended hash quote.

In some embodiments, the HACSP may respond to real-time critical interrupt-driven error conditions. The real-time critical interrupt-driven error conditions may include a tamper detection loop being broken, program logic fabric memory causing a CRC error, a watchdog timer timeout, a supply voltage or device temperature exceeding a threshold, a user-designated integrity base interrupt deemed critical for ensuring trusted mission operation, or any combination thereof. The responding to the real-time critical interrupt-driven error conditions may include disabling a portion or all of the FPGA and requiring a reset to the portion or entirety of the FPGA to restore operation. The HACSP may hash user bitstreams, user-specific measure processes that the user has incorporated as registered specific integrity checks, and FPGA environment variables, and compute an extended hash quote by including the hashes from the user bitstreams, user-specific measure processes, and FPGA environment variables.

The hashing of system elements may be combined or divided. For example, FPGA configurations may be hashed in their entirety or individual partial reconfiguration regions (PRRs) may be hashed individually. Device DNA and user eFUSE values may be hashed together. These are non-limiting examples of dividing or grouping system measurements for hashing purposes. Additionally, cumulative hashes may be used to effectively hash the history of system measurements. For example, a hash of a previous measurement may be combined with a current measurement and the combined value may be hashed. Chaining such hashes includes previous configuration states in integrity measurements and attestation rather than limiting to the system's current state.

In some embodiments, the HACSP is initialized by loading an initial bitstream. This bitstream is a binary representation of logic, data, and/or executable code. A HACSP self-test may be run to verify the initial bitstream with a reference in NVM. The measurement may be stored and attestation measurements may be performed. When the self-test does not pass, an alert may be provided if an associated problem is resolvable, or an alarm may be provided if not resolvable. When the self-test passes or the alert is resolvable, dynamic logic may be initialized to load partial bitstreams, measure partial configurations, and store measurements. In some embodiments, the HACSP and the user application reside in separate processing cores.

As noted previously, while FPGAs are described throughout this disclosure as the computing device on which some embodiments of the present invention run, any suitable computing device, such as a PSoC or similar configurable device, or an ASIC, may be used in some embodiments without deviating from the scope of the invention.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for providing a High Assurance Configuration Security Processor (HACSP) for a computing device, comprising:
protecting, by the HACSP, security of a user application bitstream load and update during computing device configuration and reconfiguration by implementing a secure, verifiable Root of Trust (RoT);
executing security mechanisms, by the HACSP, comprising independent secure trusted attestation and integrity measurement mechanisms of the HACSP to report and provide reliable evidence about trustworthiness of the computing device during user bitstream execution without stopping operation of the HACSP and the computing device in between load and updates of bitstream execution, wherein the HACSP runs independent of other applications on the computing device or in cooperation with other applications on the computing device; and
executing self-measuring of integrity on the HACSP and responding in real-time to computing device alerts after boot-up and during operation of the computing device, by the HACSP, via a real-time integrity monitoring process that uses the implemented security mechanisms and is continuously run during bitstream execution.

2. The computer-implemented method of claim 1, wherein the HACSP is implemented as a trusted system application for the computing device.

3. The computer-implemented method of claim 1, further comprising:
implementing, by the HACSP, the secure, verifiable RoT during computing device operation.

4. The computer-implemented method of claim 1, further comprising:
implementing, by the HACSP, a secure, verifiable Root of Trust (RoT) for secure continuous real-time monitoring of both its own operation and user software execution, for secure continuous real-time internal monitoring of the computing device environment, and for secure continuous real-time internal monitoring of user bitstream execution.

5. The computer-implemented method of claim 1, further comprising:
implementing, by the HACSP, a secure, verifiable Root of Trust (RoT) for secure audit/log to track its key, operations, alerts, and execution control alternatives incurred during HACSP operation, and for secure attestation to a remote system security appraiser on its operational status and the status of a user system using secure light cryptography and attestation protocols.

6. The computer-implemented method of claim 1, further comprising:
autonomously alarming to a safe state, by the HACSP, based on one or more measurements that reveal critical malfunctions in computing device operations or an active tamper condition.

7. The computer-implemented method of claim 6, wherein the safe state comprises locking down all user operations, but retaining HACSP communication to allow updates for reconfiguration and quotes to provide integrity reports to support appraiser assessment, analysis, and corrective response to malfunction or attack.

8. The computer-implemented method of claim 1, further comprising:
receiving, by the HACSP, configuration data for the HACSP and a user application;
using the HACSP configuration data, by the HACSP, to boot up and run; and
subsequently initiating user configuration using the user application configuration data, by the HACSP.

9. The computer-implemented method of claim 8, further comprising:
registering of user application monitoring activities, by the HACSP, for user-specific integrity reporting.

10. The computer-implemented method of claim 1, further comprising:
after the HACSP is operational, receiving separate encrypted user bitstreams, by the HACSP, for partial computing device configuration using Session Key Authorization Protocol (SKAP).

11. The computer-implemented method of claim 1, wherein the HACSP provides a mechanism for building an arbitration layer between a non-secure Rich Execution Environment (REE) and a secure Trusted Execution Environment (TEE).

12. The computer-implemented method of claim 11, wherein
the HACSP runs independently of a mission application in the REE, and
a mission of the mission application is the mission on which the HACSP is deployed.

13. The computer-implemented method of claim 12, wherein the HACSP is non-blocking to the mission application.

14. The computer-implemented method of claim 1, further comprising:
performing continuous self-integrity measurements, periodic quotes and periodic updates, by the HACSP, wherein
the periodic quotes comprise at least one integrity measurement.

15. The computer-implemented method of claim 1, further comprising:
performing trusted services for measure, update, and attestation, by the HACSP, for mission bitstream load/operations, wherein
a mission of the mission bitstream load/operations is the mission on which the HACSP is deployed.

16. The computer-implemented method of claim 15, wherein the trusted services for measure, update, and attestation are performed in real-time.

17. The computer-implemented method of claim 1, further comprising:
invoking updates, logging update responses, invoking quotes, and logging quote responses, by the real-time integrity monitor, wherein
the invoked quotes comprise at least one integrity measurement.

18. The computer-implemented method of claim 1, further comprising:
transmitting attestation information, by the HACSP, to a mission proxy appraiser, wherein
the attestation information comprises verification and reporting of bitstream authenticity, and
a mission of the mission proxy appraiser is the mission on which the HACSP is deployed.

19. The computer-implemented method of claim 1, further comprising:
providing, by the HACSP, Environment Security Monitoring (ESM) functionality, Trojan horse Hardware Detection (THD) functionality, Physical Unclonable Functions (PUFs) providing a device authentication randomizer and key generation, or any combination thereof.

20. The computer-implemented method of claim 19, wherein a real-time monitor of the HACSP extends into a mission application Rich Execution Environment (REE) through a TrustZone to enable more precise monitoring of the REE THD, ESM, or both, wherein
a mission of the mission application REE is the mission on which the HACSP is deployed.

21. The computer-implemented method of claim 1, further comprising:
providing near real-time monitoring, by the HACSP, to support quotes, lower impact anomalies, and service update and quote processes, wherein
the quotes comprise at least one integrity measurement.

22. The computer-implemented method of claim 1, further comprising:
initiating a real-time monitoring function, by the HACSP;
checking a reboot status, by the HACSP, to determine whether a reboot is caused by an error;
when the reboot caused the error, and the error mandates an alert, issuing the alert, by the HACSP; and
when the error is sufficient to mandate an alarm, issuing the alarm, by the HACSP.

23. The computer-implemented method of claim 22, further comprising:

resetting a software watchdog timer, by the HACSP, before the real-time monitoring function returns.

24. The computer-implemented method of claim 1, further comprising:
performing, by HACSP, integrity measurements hashing for bitstreams and configurations.

25. The computer-implemented method of claim 24, further comprising:
obtaining, by the HACSP, a programmable logic (PL) peripheral control registers hash, a PL address control registers hash, a PL memory configuration hash, a HACSP bitstream hash, a TrustZone configuration hash, and a computing device DNA hash; and
performing, by the HACSP, a user-specific measurement process with a user bitstream hash.

26. The computer-implemented method of claim 24, further comprising:
hashing, by the HACSP, user bitstreams; and
computing, by the HACSP, an extended hash quote including the hashed user bitstreams, wherein
the extended hash quote comprises at least one integrity measurement.

27. The computer-implemented method of claim 26, wherein the computing of the extended hash quote further comprises including user-specific measure processes that the user has incorporated as registered specific integrity checks are measured.

28. The computer-implemented method of claim 26, wherein device environment variables are measured, hashed, and updated as part of the extended hash quote.

29. The computer-implemented method of claim 1, further comprising:
responding, by the HACSP, to real-time critical interrupt-driven error conditions.

30. The computer-implemented method of claim 29, wherein the real-time critical interrupt-driven error conditions comprise a tamper detection loop being broken, program logic fabric memory causing a CRC error, a watchdog timer timeout, a supply voltage or device temperature exceeding a threshold, a user-designated integrity base interrupt deemed critical for ensuring trusted mission operation, or any combination thereof.

31. The computer-implemented method of claim 29, wherein the responding to the real-time critical interrupt-driven error conditions comprises disabling a portion or all of the computing device and requiring a reset to the portion or entirety of the computing device to restore operation.

32. The computer-implemented method of claim 29, further comprising:
hashing user bitstreams, user-specific measure processes that the user has incorporated as registered specific integrity checks, and computing device environment variables, by the HACSP; and
computing an extended hash quote, by the HACSP, by including the hashes from the user bitstreams, user-specific measure processes, and computing device environment variables, wherein
the extended hash quote comprises at least one integrity measurement.

33. The computer-implemented method of claim 1, further comprising:
initializing the HACSP by loading an initial bitstream;
running a HACSP self-test to verify the initial bitstream with a reference in non-volatile memory (NVM);
storing the measurement and performing attestation measurements;

when the self-test does not pass, providing an alert if an associated problem is resolvable, or an alarm if not resolvable; and
when the self-test passes or the alert is resolvable, initializing dynamic logic to load partial bitstreams, measure partial configurations, and store measurements.

34. The computer-implemented method of claim 1, wherein the HACSP and the user application reside in separate processing cores.

35. A High Assurance Configuration Security Processor (HACSP) computer program embodied on a non-transitory computer-readable medium, the program configured to cause at least one processing core of a computing device to:
execute security mechanisms comprising independent secure trusted attestation and integrity measurement mechanisms of the HACSP to report and provide reliable evidence about trustworthiness of the computing device during user bitstream execution without stopping operation of the HACSP and the computing device, wherein the HACSP runs independent of other applications on the computing device or in cooperation with other applications on the computing device; and
execute self-measuring of integrity on the HACSP and respond in real-time to computing device alerts after boot-up and during operation of the computing device via a real-time integrity monitor process that uses the implemented security mechanisms and is continuously running during bitstream execution, implemented as an internal super loop, implemented in hardware as a Finite State Machine (FSM), or a combination thereof.

36. The computer program of claim 35, wherein the program is further configured to cause the at least one processing core to:
protect security of a user application bitstream load and update during computing device configuration and reconfiguration by implementing a secure, verifiable Root of Trust (RoT) for computing device loading, boot-up, initialization, configuration, and during operation.

37. The computer program of claim 35, wherein the program is further configured to cause the at least one processing core to:
autonomously alarm to a safe state based on one or more measurements that reveal critical malfunctions in computing device operations or an active tamper condition, wherein
the safe state comprises locking down all user operations, but retaining HACSP communication to allow updates for reconfiguration and quotes to provide integrity reports to support appraiser assessment, analysis, and corrective response to malfunction or attack.

38. The computer program of claim 35, wherein
the HACSP provides a mechanism for building an arbitration layer between a non-secure Rich Execution Environment (REE) and a secure Trusted Execution Environment (TEE),
the HACSP runs independently of a mission application in the REE, and
a mission of the mission application is the mission on which the HACSP is deployed.

39. The computer program of claim 35, wherein the program is further configured to cause the at least one processing core to:
perform continuous self-integrity measurements, perform updates, and perform attestation for mission bitstream load/operations, wherein a mission of the mission bitstream load/operations is the mission on which the HACSP is deployed.

40. The computer program of claim 35, wherein the program is further configured to cause the at least one processing core to:
- respond to real-time critical interrupt-driven error conditions by disabling a portion or all of the computing device and requiring a reset to the portion or entirety of the computing device to restore operation, wherein
- the real-time critical interrupt-driven error conditions comprise a tamper detection loop being broken, program logic fabric memory causing a CRC error, a watchdog timer timeout, a supply voltage or device temperature exceeding a threshold, a user-designated integrity base interrupt deemed critical for ensuring trusted mission operation, or any combination thereof.

41. A computing device, comprising:
a High Assurance Configuration Security Processor (HACSP) residing as a software application in a first processing core associated with a Trusted Execution Environment (TEE), the HACSP configured to:
- monitor user applications in software that runs on a second processing core,
- execute security mechanisms comprising independent secure trusted attestation and integrity measurement mechanisms of the HACSP to report and provide reliable evidence about trustworthiness of the FPGA during user bitstream execution without stopping operation of the HACSP and the computing device, wherein the HACSP runs independent of other applications on the computing device or in cooperation with other applications on the computing device, and
- execute self-measuring of integrity on the HACSP and respond in real-time to computing device alerts after boot-up and during operation of the computing device via a real-time integrity monitor process that uses the implemented security mechanisms that is continuously running during bitstream execution, the real-time monitor process part of a lightweight real-time operating system (RTOS), implemented as an internal super loop, implemented in hardware as a Finite State Machine (FSM), or a combination thereof.

42. The computing device of claim 41, wherein the HACSP is further configured to:
protect security of a user application bitstream load and update during computing device configuration and reconfiguration by implementing a secure, verifiable Root of Trust (RoT) for computing device loading, boot-up, initialization, configuration, and during operation.

43. The computing device of claim 41, wherein the HACSP is further configured to:
autonomously alarm to a safe state based on one or more measurements that reveal critical malfunctions in computing device operations or an active tamper condition.

44. The computing device of claim 41, wherein
the HACSP provides a mechanism for building an arbitration layer between a non-secure Rich Execution Environment (REE) and a secure Trusted Execution Environment (TEE),
the HACSP runs independently of a mission application in the REE, and
a mission of the mission application is the mission on which the HACSP is deployed.

45. The computing device of claim 41, wherein the HACSP is further configured to:
perform continuous self-integrity measurements, perform updates, and perform attestation for mission bitstream load/operations, wherein
a mission of the mission bitstream load/operations is the mission on which the HACSP is deployed.

46. The computing device of claim 41, wherein the HACSP is further configured to:
respond to real-time critical interrupt-driven error conditions by disabling a portion or all of the computing device and requiring a reset to the portion or entirety of the computing device to restore operation.

\* \* \* \* \*